(12) United States Patent
Miller et al.

(10) Patent No.: US 10,055,598 B2
(45) Date of Patent: Aug. 21, 2018

(54) CONTENT AND SERVICE AGGREGATION, MANAGEMENT AND PRESENTATION SYSTEM

(71) Applicant: Synacor, Inc., Buffalo, NY (US)

(72) Inventors: Jason Jeffrey Miller, Milton (CA); Jaafer Haidar, London (CA)

(73) Assignee: SYNACOR INC., Buffalo, NY (US)

( * ) Notice: Subject to any disclaimer, the term of this patent is extended or adjusted under 35 U.S.C. 154(b) by 0 days.

(21) Appl. No.: 14/206,149

(22) Filed: Mar. 12, 2014

(65) Prior Publication Data

US 2014/0282851 A1    Sep. 18, 2014

Related U.S. Application Data

(60) Provisional application No. 61/826,810, filed on May 23, 2013, provisional application No. 61/779,424, filed on Mar. 13, 2013.

(51) Int. Cl.
  *G06F 21/62* (2013.01)
  *H04W 4/21* (2018.01)
  (Continued)

(52) U.S. Cl.
  CPC ............ *G06F 21/62* (2013.01); *H04L 63/102* (2013.01); *H04L 65/4084* (2013.01);
  (Continued)

(58) Field of Classification Search
  CPC ....... G06F 21/10; G06F 21/105; G06F 21/121
  See application file for complete search history.

(56) References Cited

U.S. PATENT DOCUMENTS 7,925,592 B1    4/2011   Issa
8,402,555 B2    3/2013   Grecia
(Continued)

FOREIGN PATENT DOCUMENTS

CN    101001355    7/2007
CN    101578862    11/2009
(Continued)

OTHER PUBLICATIONS

Biddle, "Facebook connect goes to the movies," The Facebook Blog [online], Mar. 24, 2009 [retrieved on Oct. 1, 2013]. Retrieved from the Internet: <URL: https://blog.facebook.com/blog.php-?post=62329872130>, 2 pages.
(Continued)

*Primary Examiner* — Kaveh Abrishamkar
(74) *Attorney, Agent, or Firm* — Bond, Schoeneck & King, PLLC

(57) ABSTRACT

Techniques for facilitating discovery and usage of digital content and services include accessing a stored rights profile of a user and determining access privileges of the user to content items or services provided by various sources. Based on the access privileges of the user, multiple access options are determined to a content item or to a service available to the user. The multiple access options include access options for accessing the content item or the service from different sources. The access options are presented to a user and a selection of an access option is received from the user. Stored business rules for the source are accessed, which identify a consumption mode specified by the source for enabling users to consume content items or services provided by the source. The user is enabled to perceive the content item or receive the service in accordance with the consumption mode.

22 Claims, 17 Drawing Sheets

(51) Int. Cl.
  *H04L 29/06*  (2006.01)
  *H04L 29/08*  (2006.01)
  *H04W 4/20*  (2018.01)

(52) U.S. Cl.
  CPC ............ *H04L 67/306* (2013.01); *H04L 67/36* (2013.01); *H04W 4/206* (2013.01); *H04W 4/21* (2018.02); *H04L 63/0815* (2013.01); *H04L 67/10* (2013.01)

(56) References Cited

U.S. PATENT DOCUMENTS

| | | |
|---|---|---|
| 8,533,860 B1 | 9/2013 | Grecia |
| 8,887,308 B2 | 11/2014 | Grecia |
| 2004/0039911 A1 | 2/2004 | Oka |
| 2004/0044779 A1* | 3/2004 | Lambert ................ G06Q 10/10 709/229 |
| 2005/0240588 A1 | 10/2005 | Siegel |
| 2006/0195479 A1 | 8/2006 | Spiegelman |
| 2006/0212367 A1 | 9/2006 | Gross |
| 2007/0276864 A1 | 11/2007 | Espelien |
| 2008/0034064 A1 | 2/2008 | Choi et al. |
| 2008/0049782 A1 | 2/2008 | Nichols et al. |
| 2008/0075281 A1* | 3/2008 | Zeng ........................ G06F 21/33 380/44 |
| 2008/0127289 A1 | 5/2008 | Julia |
| 2008/0244751 A1 | 10/2008 | Peinado |
| 2009/0240693 A1 | 9/2009 | Davidson |
| 2010/0125511 A1 | 5/2010 | Jouret |
| 2011/0072078 A1 | 3/2011 | Chai |
| 2011/0143651 A1 | 6/2011 | Marocchi |
| 2011/0150214 A1 | 6/2011 | Gleim |
| 2011/0202430 A1 | 8/2011 | Narayanan |
| 2011/0225417 A1 | 9/2011 | Maharajh |
| 2012/0011534 A1 | 1/2012 | Mukerji |
| 2012/0066386 A1* | 3/2012 | McGowan .......... G06F 21/6218 709/225 |
| 2012/0078997 A1 | 3/2012 | Evans et al. |
| 2012/0079606 A1* | 3/2012 | Evans ...................... G06F 21/10 726/28 |
| 2012/0110678 A1 | 5/2012 | Kumble |
| 2012/0144308 A1 | 6/2012 | Welingkar |
| 2012/0159337 A1 | 6/2012 | Travilla |
| 2012/0317288 A1 | 12/2012 | Campana |
| 2012/0323349 A9 | 12/2012 | Khedouri et al. |
| 2013/0013698 A1 | 1/2013 | Relyea et al. |
| 2013/0036155 A1 | 2/2013 | Shaw |
| 2013/0138967 A1 | 5/2013 | Auld |
| 2013/0179949 A1 | 7/2013 | Shapiro |
| 2013/0218961 A1 | 8/2013 | Ho |
| 2013/0239003 A1 | 9/2013 | Usenko |
| 2013/0267250 A1 | 10/2013 | Lin |
| 2013/0298216 A1* | 11/2013 | Kuznetsov .............. G06F 21/00 726/8 |
| 2014/0006423 A1 | 1/2014 | Melnychenko |
| 2014/0130144 A1 | 5/2014 | Yang et al. |
| 2014/0222910 A1 | 8/2014 | Petersen |
| 2014/0236792 A1* | 8/2014 | Pant ....................... G06Q 40/02 705/35 |
| 2014/0280498 A1 | 9/2014 | Frankel |
| 2015/0193433 A1 | 7/2015 | Dykeman |

FOREIGN PATENT DOCUMENTS

| | | |
|---|---|---|
| CN | 102665129 | 9/2012 |
| CN | 102881903 | 1/2013 |
| CN | 102946553 | 2/2013 |
| WO | WO 2011/102825 | 8/2011 |

OTHER PUBLICATIONS

Ho, "Apple scoops up Matcha.tv to pack more smarts into Apple TV," TechCrunch [online] Aug. 13, 2013 [retrieved Oct. 1, 2013]. Retrieved from the Internet: <URL: http://techcrunch.com/2013/08/13/apple-scoops-up-matcha-tv-to-pack-more-smarts-into-apple-tv/>, 5 pages.
Jolicloud, "Introducing Jolidrive," Jolicloud [online], captured Mar. 7, 2013. Retrieved from the Internet:<URL: http://web.archive.org/web/20130307045457/http://www.jolicloud.com/>, 5 pages.
Jolicloud, "Introducing the new Jolicloud," Jolicloud [online], captured Feb. 25, 2012. Retrieved from the Internet: <URL: http://web.archive.org/web/20120225195656/http://www.jolicloud.com/>, 3 pages.
Matcha, "Video Discovery Experience for Connected Devices," AngelList [online] Summer 2012. Retrieved from the Internet: <URL: https://angel.co/matcha>, 3 pages.
ShowYou, [online], captured Jan. 16, 2013, Retrieved from the Internet: <URL: http://web.archive.org/web/20130116032504/http://showyou.com/>, 7 pages.
ShowYou, [online], captured Mar. 7, 2012. Retrieved from the Internet: < URL: http://web.archive.org/web/20120307003630/http://showyou.com/>, 2 pages.
Sullivan, "Facebook's New News Feed: The Before & After Look," Marketing Land [online], Mar. 7, 2013, [retrieved on Oct. 1, 2013]. Retrieved from the Internet: <URL: http://marketingland.com/facebook-news-feed-the-before-after-35632>, 12 pages.
International Search Report and Written Opinion for PCT/US2014/24318, dated Jul. 29, 2014, 9 pages.
International Search Report and Written Opinion for PCT/US2014/024665, dated Aug. 5, 2014, 10 pages.
International Preliminary Report on Patentability for PCT/US2014/024318, dated Sep. 24, 2015, 5 pages.
International Preliminary Report on Patentability for PCT/US2014/024665, dated Sep. 24, 2015, 6 pages.
European Search Report in Application No. 14779546.2, dated Jul. 18, 2016, 7 pages.
European Search Report in Application No. 14775216.6, dated Jul. 13, 2016, 6 pages.
Japanese Office Action in International Application No. 2016-501496, dated Mar. 6, 2018, 6 pages (with English translation).
Chinese Office Action in Application No. 201480023097.6, dated Jan. 29, 2018, 11 pages (with English Translation).

* cited by examiner

US 10,055,598 B2

CONTENT AND SERVICE AGGREGATION, MANAGEMENT AND PRESENTATION SYSTEM

CROSS-REFERENCE TO RELATED APPLICATIONS

This application claims priority to U.S. Provisional Application No. 61/826,810, filed on May 23, 2013 and U.S. Provisional Application Ser. No. 61/779,424, filed on Mar. 13, 2013, the entire contents of which are hereby incorporated by reference.

FIELD

This specification describes technologies related to aggregation, management and presentation of content and services.

BACKGROUND

Digital content and service distribution spans a wide range of different industries and companies, including online internet subscription-based content providers, online internet marketplaces, cloud-based services, cable/satellite TV operators, telecommunication companies, and consumer electronics manufacturers. Different sources of content and services provide their consumers with different types of content items and services, through different types of media, using different types of business models. For example, if the source is an online internet subscription-based content provider, it may provide its consumers with temporary access rights to online internet video, music, games, images, or financial services, in exchange for a regular subscription payment. As another example, if the source is an online internet marketplace, it may provide its consumers with permanent ownership rights to download various types of internet content, in exchange for a one-time purchase. As another example, if the source is an email service, it may enable its consumers to communicate via email, messaging, or voice, in exchange for different levels of subscription plans. As yet another example, if the source is a cable/satellite operator, it may provide its consumers with a choice of various bundled packages of scheduled programming and on-demand content, in exchange for different tiers of subscription plan payments.

Different sources, such as content and service distribution companies, typically keep track of consumers by maintaining a record for each consumer, including user name and address, payment information, account number and/or username and password. When a consumer attempts to access a content item or service from a source, the source typically verifies the user's credentials via an appropriate authentication protocol, determines access privileges for the consumer, and presents the content item or service to the consumer. Meanwhile, another source may have its own relationship with the same consumer, maintaining its own database of the consumer's information, and use its own authentication credentials to verify the consumer's access privileges for the content item or service provided by the source. Therefore, a single consumer typically has multiple relationships with different sources, and uses different access mechanisms to consume content items and services from each source.

SUMMARY

In one aspect, a computer-implemented method includes accessing a stored rights profile of a user and based on the stored rights profile of the user, determining associated access privileges of the user to content items or services provided by a first source and to content items or services provided by a second source. The method also includes determining, based on the access privileges of the user, multiple access options to a particular content item or to a particular service available to the user. The multiple access options include a first access option corresponding to accessing the particular content item or the particular service from the first source and a second access option corresponding to accessing the particular content item or the particular service from the second source. The method also includes presenting, to the user, the determined multiple access options to the particular content item or the particular service and receiving a selection, from the user, of the first access option. The method also includes accessing stored business rules for the first source. The stored business rules identify a consumption mode specified by the first source for enabling users to consume content items or services provided by the first source. The method further includes enabling the user to perceive the particular content item or receive the particular service in accordance with the consumption mode specified by the first source.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

DETAILED DESCRIPTION

Figure 1:
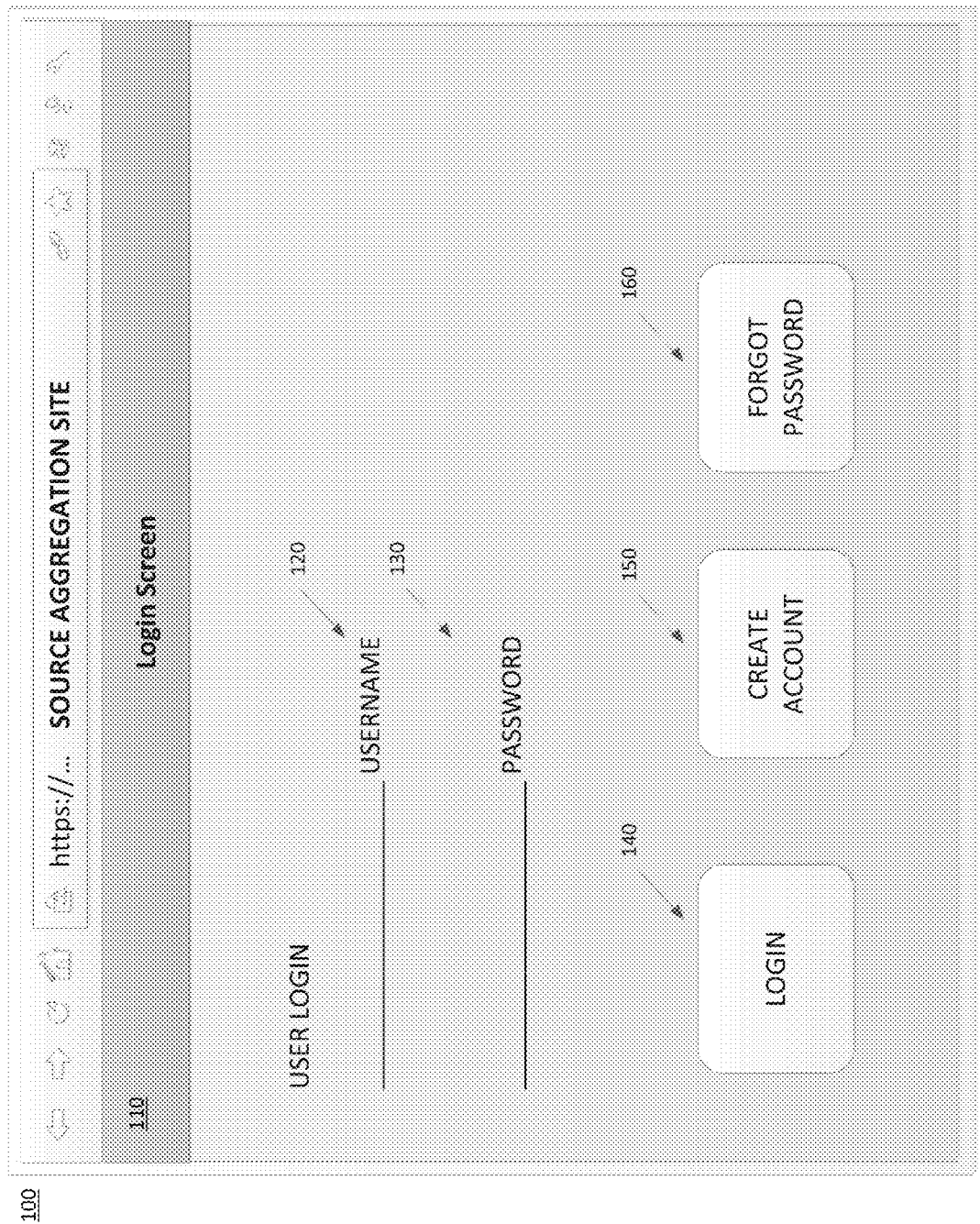
FIG. 1 is a sketch of an example of a graphical user interface (GUI) for a login page for a source aggregation website, according to some implementations.

The disclosed techniques facilitate discovery and usage of digital content and services from a variety of different sources. In particular, some implementations enable a single authentication platform that maintains relationships with different sources of content and services, automatically authenticates a consumer with the different sources, and enables consumers to discover and access content items and services from the different sources. In some implementations, a dynamic container is provided that is based on a consumer's rights profile, which may dynamically update and maintain the consumer's access privileges to content items and services from the different sources.

The process of obtaining the consumer's rights profile may include automatically requesting information from the different sources, based on a single set of credentials provided by the user. The sources may be any provider of media content and/or services, including but not limited to, online internet subscription-based services, online internet marketplaces, storage and email services, cable/satellite TV operators, telecommunication companies, and consumer electronics manufacturers. As such, the term "source" is used to represent any entity that provides consumers with access to media content and services, including, but not limited to, photos, images, music (e.g., song files), audio (e.g., sound effect files), scheduled TV/cable programming, movies, video clips, applications, games, data files, electronic documents, e-books, e-magazines, financial services (e.g., bill pay), weather, communications (e.g., email). The source may be a direct source of media content and services (e.g., websites that provide streaming video and music) or the source may be an indirect source of media content and services (e.g., cable TV providers providing access to different channels).

One approach to providing content and services to consumers involves consumers separately accessing each individual source and browsing media content items and services within each source. The problem with this approach is that it can be cumbersome and result in media content items or services not being discovered as consumers are not fully aware of their existence. For example, if a consumer has a subscription with an online movie streaming website and another subscription with a cable TV provider, then the consumer typically manages separate accounts for each content provider, with different ways of accessing and modifying subscriptions on those accounts. The consumer must then access content items on the movie website and the cable TV provider separately, to discover content on a provider-by-provider basis.

Another approach to providing content and services to consumers is to provide an aggregated collection of content and/or services, either using an internet website or other aggregator. But again, the problem with such aggregators is that consumers are typically required to provide authentication credentials for each source. For example, an online website may present a consumer with a list of aggregated movies from different sources. In this example, however, the consumer must typically provide his or her authentication credentials for each source, in order to access movies from those sources. As such, the consumer must maintain and manage his or her own subscriptions to different sources, in this example media content providers, separately, regardless of whether the consumer accesses the sources individually or via an aggregator.

To mitigate this problem, the disclosed system is not only capable of aggregating a pool of content items and services collected from a variety of sources, but also may work in tandem with the sources to transparently maintain and manage the consumer's subscriptions to that pool of content items and services, on behalf of a consumer. For example, the system may be capable of using deeper business relationships with the sources to provide automatic subscription management and updates for the consumer. Based on such relationships with various sources, in some implementations, the system may be capable of authenticating itself with different sources and, based on the authenticating, automatically ascertain the content items and services that a consumer can access through the sources. Specifically, some implementations automatically track a consumer's subscriptions and access privileges to different sources, and dynamically update the pool of content items and services available to the consumer based on changes to the access privileges.

In some implementations, rather than requiring the user to manage access to each individual source, the disclosed system interacts directly with each source to automatically authenticate a consumer and verify the consumer's access privileges to content items and services from the different sources. In some implementations, this enables the consumer to access content items and services from a variety of different sources using a single sign on (SSO) mechanism.

In some implementations, the disclosed system may maintain a user profile, provide account management, SSO, authentication, reports and auditing, and integration technology between different sources. The system may also be multi-platform and multi-language, thus providing authentication for consumers anytime, anywhere, all with one password. In some implementations, the disclosed system may facilitate sources in granting their consumers easy access to content items and services using the consumers' existing authentication credentials, such as credentials established through social networking and media sharing sites. Such third-party authentication credentials may be used in addition, or as an alternative, to the SSO provided by the disclosed system. As such, the system may simplify online authentication so that digital content and service consumers are securely identifiable on any screen, anywhere.

The disclosed system may be content-centric, in that it may provide a unified access point to content items and services across multiple sources that the consumer has access to, including paid subscriptions and services, owned content, and local and network files. In some implementations, the system is able to consolidate different types of content items and services that a consumer can access from multiple different sources and transparently allow the user to access an aggregate pool of content items and services, via a single-sign-on mechanism.

Notably, the disclosed techniques and systems are broadly applicable to various types of media content and/or services available from different sources. For example, the disclosed techniques and systems may be used for photos, images, music (e.g., song files), audio (e.g., sound effect files), scheduled TV/cable programming, movies, television shows, video clips, applications, games, data files, electronic documents, e-books, e-magazines, financial services (e.g., bill pay), weather, communications (e.g., email).

Herein the term "content item" is used to represent a unit of consumable content that is selected from a pool of other content items provided for browsing, selection and consumption by users. A content item may be, for example, a movie, a song, an image, an electronic document, an e-book, an e-magazine, a television show episode, an application or a video clip. A content item is to be distinguished from a "service," which is used to represent one or more functions or applications that consumers can use to perform various actions or tasks. A service may be, for example, an electronic communications service (e.g., an e-mail service), a media sharing service (e.g., a DROPBOX® service), or a cloud storage service.

The disclosed system may therefore provide consumers with a single online portal to access content items and services from a variety of sources using a cloud-based, cross-device, everywhere experience. Consumers may enjoy a seamless way to get content, pay bills, manage subscriptions and purchased content, and more. The system may provide innovative search, discovery and recommendation solutions, combined with deep social integration, to drive user engagement across multiple devices.

The system may also have numerous benefits to sources, such as media content providers and subscription-based services, by enabling the sources to deliver content and services to their consumers across multiple devices, anytime, anywhere. In some implementations, the system may also package popular subscriptions and content items from the sources. For example, bundles of popular and compelling online subscriptions, focused on areas such as music, games, education, and sports, may be offered by the system to consumers. This not only creates a rich consumer experience by facilitating the discovery of new content and services for consumers, but also offers an opportunity for sources to up-sell their content and services to consumers, creating a revenue-share opportunity while increasing the brand value of the sources.

As will be discussed in more detail below, in some implementations, a source aggregation computer system may facilitate interactions between a consumer and different sources. The source aggregation computer system may perform various functions to provide a seamless experience of browsing for content and services as a consumer interacts with different sources.

In some implementations, the source aggregation computer system may store information about the consumer and/or sources of content and services. For example, the source aggregation computer system may store a rights profile for a consumer, which may indicate the consumer's authentication credentials and access privileges to different sources of content and services. Additionally or alternatively, the source aggregation computer system may store one or more source rules for the sources, indicating agreements or provisions that have been established between the sources and an entity operating the source aggregation computer system. Such source rules may, for example, specify restrictions and/or privileges specified by each source, which may involve access rights, authentication protocols, and/or ways that the consumer can consume content and/or services.

In some implementations, the source aggregation computer system may automatically and transparently manage and implement a consumer's rights profile and/or different source rules. As such, the source aggregation computer system may provide a consumer with a more seamless experience while interacting with a diverse range of sources. In some implementations, the source aggregation computer system may provide a single-sign-on (SSO) mechanism for a consumer to access different sources of content and services. In some implementations, source rules that are established with a source may enable the source aggregation computer system to automatically authenticate a consumer with that source. For example, when a consumer logs into the source aggregation computer system, the source aggregation computer system may automatically extract appropriate information about the user, transmit that information to different sources of content and services, and receive back authentication credentials for that consumer to access each source. As such, the consumer may not need to explicitly identify and authenticate with each source individually.

In some implementations, by providing a single authentication platform for consumers, the source aggregation computer system may facilitate discovery of content items and services that may not have otherwise been noticed by the consumer. For example, the source aggregation computer system may use the consumer's rights profile to search for games (i.e., game applications) or other types of application from different game or application providers to which the consumer has appropriate access privileges, and present the aggregated pool of accessible games or applications to the consumer. As such, the consumer can access a single integrated pool of content items, from which to select and consume. In some implementations, the source aggregation computer system may use advanced search features, depending on specific source rules specified by the sources. As non-limiting examples, the source aggregation computer system may cross-correlate the consumer's interests between different sources of content and services, to present more targeted content and services to the consumer. Regardless of the exact nature of search and discovery, the source aggregation computer system may automatically authenticate a consumer's access rights with different sources, discover the consumer's personal content and services, and present the aggregated pool of personal content items and services to the user. This may provide the consumer with a broader and richer media content and service discovery than if the consumer simply browsed each individual source separately.

In addition or as an alternative to discovering and aggregating personalized and targeted content and services for a consumer, the source aggregation computer system may personalize the actual consumption of content and services. For example, the consumption of a content item or service may be personalized based on different characteristics of the consumer, such as the device used to access the content item or service, computing platform, language, etc. In some implementations, a source may specify in its source rules that a particular consumer should access a particular content item or service in a particular way. In such cases, the source aggregation computer system may automatically detect and implement such source rules when presenting a content item or service to the consumer. As an example, a photo sharing website may specify in its source rules that consumers using a particular computing platform (e.g., a particular operating system on a desktop or a mobile device) should be allowed to consume a content item directly within a website provided by the source aggregation computer system. In such cases, the photo-sharing content provider may transmit a raw data feed of content items to the source aggregation computer system, for appropriate presentation to the consumer. As another example, a cable TV provider may specify in its source rules that a consumer should access a streaming video content item via an application owned by the cable TV provider. As such, the source aggregation computer system may automatically open the application for the consumer to access the content item. In these examples, a source's specifications may be designed to provide a consumer with an optimum content and service consuming experience, and/or to enable the source to promote a richer set of features to the consumer. As yet another example, if a source specifies that a particular content item or service can only be consumed in a particular format, and if that format is incompatible with a consumer's device, then the source aggregation computer system may automatically detect this incompatibility and not present the content item or service to the consumer on that device. As such, the consumer may be relieved from frustration and encountering dead ends when trying to access different media content items and services, with possibly different consumption requirements, from a variety of different sources.

After the source aggregation computer system authenticates a consumer with a source of content or services, the consumer may use the source aggregation computer system not only to browse and consume content and services, but also to modify his or her access privileges and credentials for different sources. As a non-limiting example, a user may use the source aggregation computer system to upgrade his or her subscription level to a particular music download marketplace, without having to separately navigate to the marketplace itself, login and make the changes. As such, in some implementations, the source aggregation computer system may provide consumers with a single authentication platform by which to not only discover and consume content and services from a wide variety of sources, but also to manage his or her access rights with the different sources, all in a single, seamless platform.

FIGS. 1-8 and 9A-9D illustrate different example GUIs that may be presented to a consumer by an source aggregation computer system that facilitates content and service consumption for the consumer. For ease of exposition, several example GUIs depicted in FIGS. 1-8 and 9A-9D are described with respect to a particular scenario in which the source is a video content provider that provides online movies to a consumer. It should be appreciated, however, that implementations are not limited to video content, nor even content items in general, and may be used to facilitate consumption of services, such as cloud-based email or storage services, to consumers.

The several example GUIs depicted in FIGS. 1-8, 9A and 9B assume that the source aggregation computer system enables user access to its source aggregation services via a web site, i.e., via a source aggregation web site. In other implementations, the source aggregation computer system may provide user access to its source aggregation services in a different manner, such as, for example, via a native application on the computing platform of the user.

FIG. 1 illustrates an example GUI 100 provided by the source aggregation site that allows a consumer to provide credentials for a SSO experience. In this example, a log in screen 110 is presented to a user, requesting authentication credentials, such as a username 120 and a password 130. The username 120 and the password 130 may be credentials that were established through the source aggregation site, or may be credentials established through a third-party entity that provides for authentication of credentials. Regardless of the exact nature of the authentication credentials, a user may login to the aggregation site using login button 140, create a new account on the aggregation site using button 150, or retrieve his or her credentials using button 160.

Figure 2:
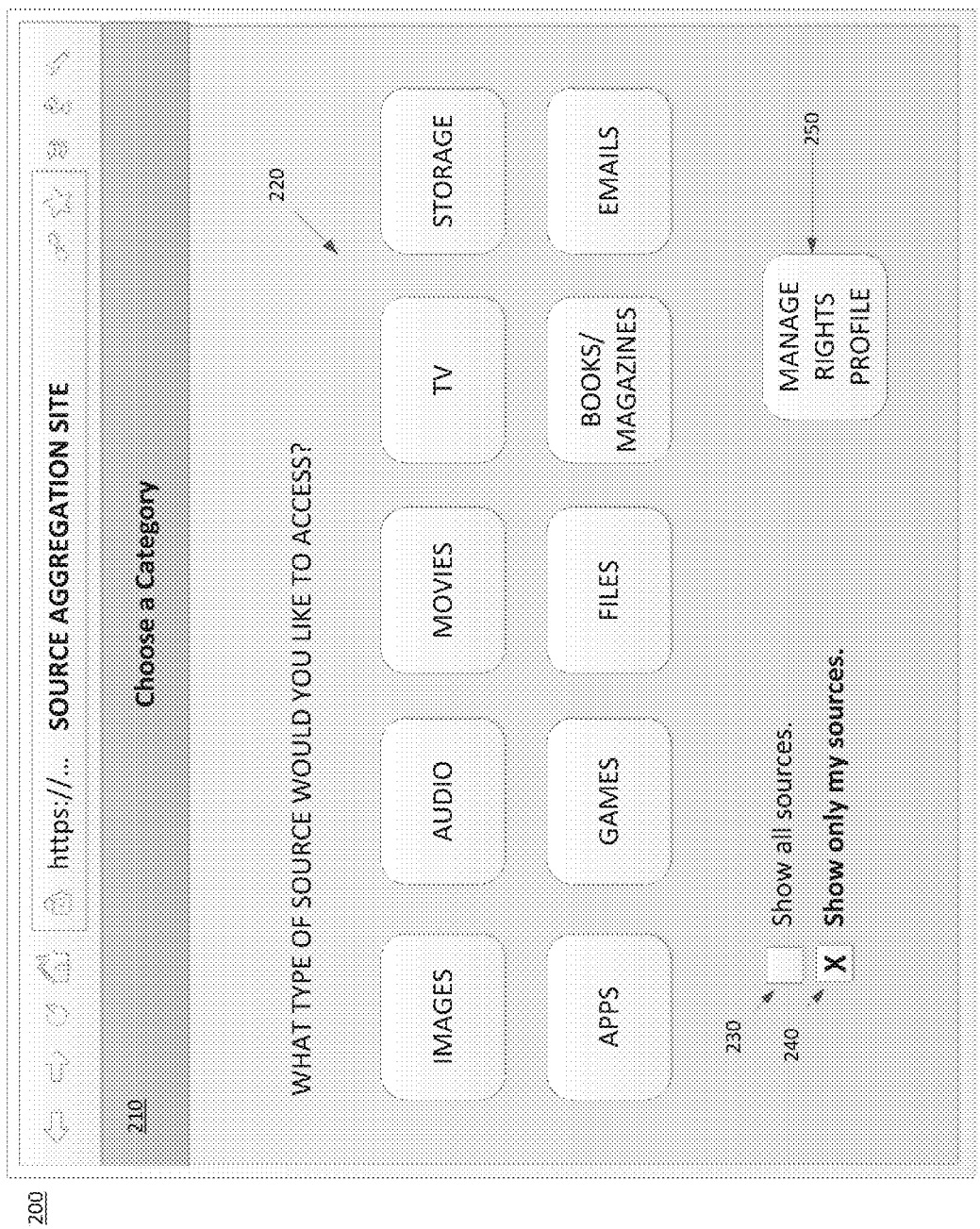
FIG. 2 is a sketch of an example of a GUI for a content browser for accessing different types of content and services, according to some implementations.

FIG. 2 illustrates an example GUI 200 for an aggregation site that allows users to access different types of sources of content and services, according to some implementations. In this example, a category choosing screen 210 is presented to a user, to select from various types of sources of content and services. As a non-limiting example, ten different types of sources are illustrated in the selection list 220, including images, audio, video, TV, storage services, applications, games, files, books/magazines, and email services. The category choosing screen 210 also presents option checkbox 230 for showing all sources or option checkbox 240 for only showing the sources to which the consumer has access rights, via subscription or purchase, for example. The category choosing screen 210 may also have a selection button 250 whereby the consumer may manage his or her rights profile through the source aggregation computer system. In response to a consumer selecting option checkbox 250, the source aggregation computer system may present a screen indicating the consumers various access privileges to different sources, an example of which is shown in FIG. 3.

Figure 3:
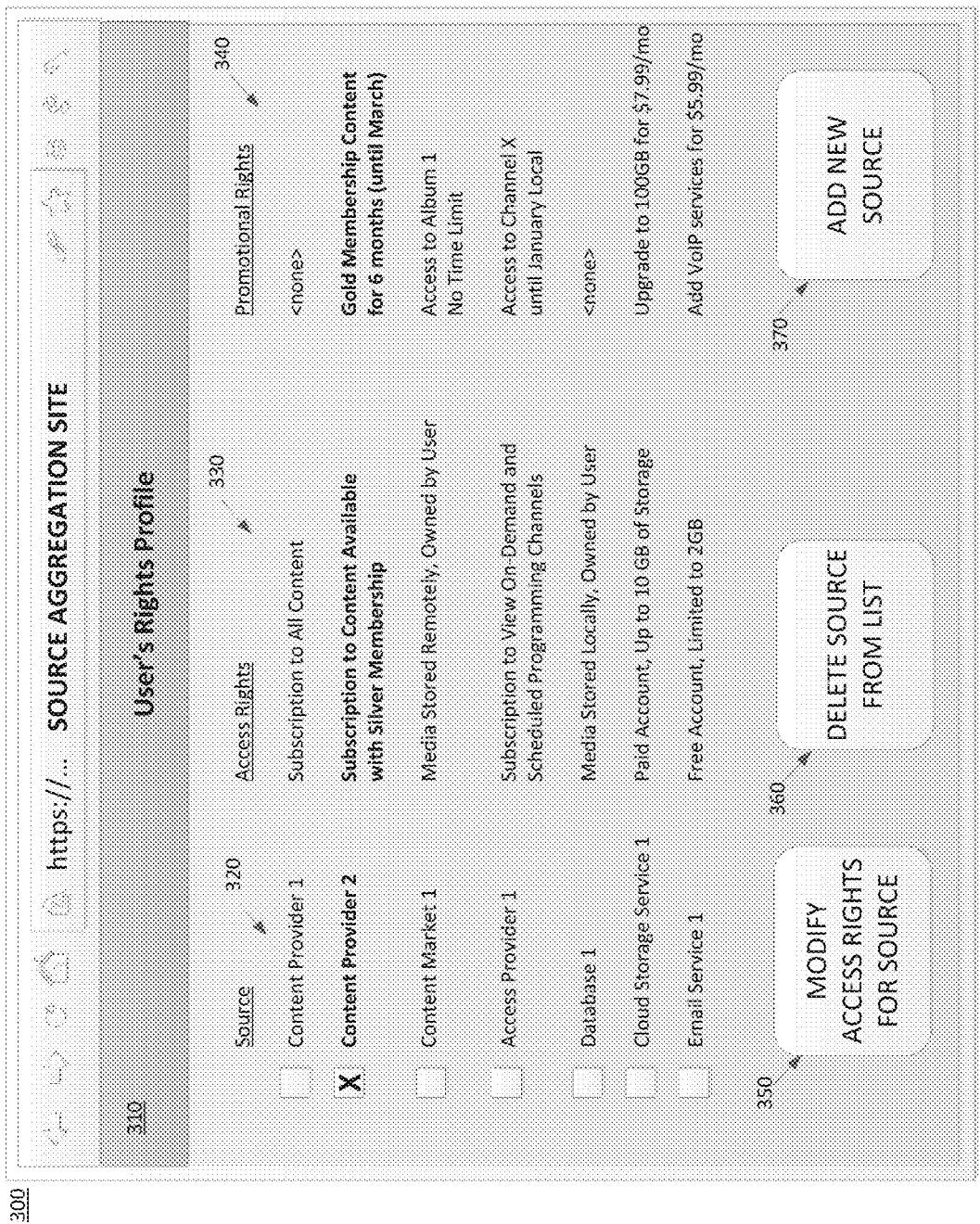
FIG. 3 is a sketch of an example of a GUI for a user rights profile page, according to some implementations.

FIG. 3 shows an example GUI 300 provided by the source aggregation site, in which a consumer may manage his or her rights profile, according to some implementations. The user rights profile screen 310 lists the consumer's access rights for various sources of content and services that are available through the source aggregation site. In this non-limiting example, column 320 lists various sources, including: content providers that may provide access by subscription to online content; a content market that may provide access to stored media owned by the consumer; an access provider that may provide access to either on-demand or scheduled TV programming channels; a database that may store purchased or downloaded media on the consumers local storage device; a cloud storage service that may provide remote storage services for a consumer to store various types of content; and an email service that may provide the consumer with various communication services. In some implementations, column 330 may indicate the consumer's specific access rights to each of these exemplary sources, indicating different levels of access that the consumer has established with each source. In some implementations, there may be additional information presented in the rights profile screen 310, such as column 340 that indicates any promotional rights that the consumer may purchase for each source. It should be appreciated, however, that implementations are not limited to a particular format for listing of access rights for different sources. Regardless of the exact format of the information presented in the rights profile screen 310, the disclosed system may present a user with his or her rights profile, which is used by the system to maintain and implement the consumer's access privileges to different sources.

In some implementations, there may be a modify rights button 350 that a consumer can press to modify his or her access rights for a selected source (explained further below in relation to FIG. 4), and a delete source button 316 at the consumer can press to delete the selected source. In some implementations, the rights profile screen 310 may present the consumer with an option, such as new source button 370, to add a new source that the consumer may not already have a relationship with (explained further below in relation to FIG. 5).

Figure 4:
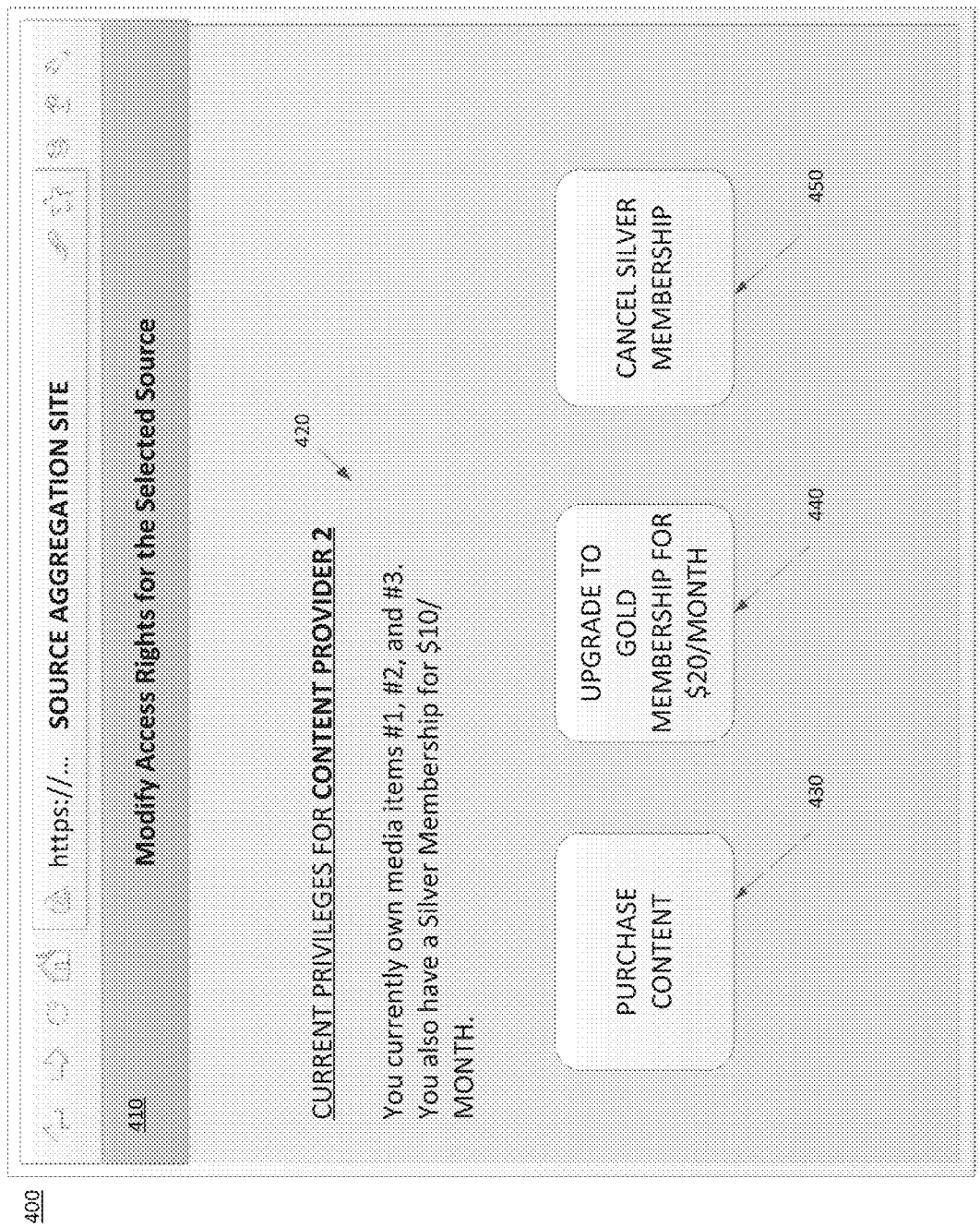
FIG. 4 is a sketch of an example of a GUI for modifying access rights to a media content provider, according to some implementations.

FIG. 4 illustrates an example GUI 400 that may be presented by the source aggregation site to allow a consumer to modify his or her access rights for a selected source. For example, GUI 400 may be presented to a consumer in response to the consumer selecting the modify rights button 350 in FIG. 3. In this example, the modify access rights screen 410 contains a list 420 of the consumer's access privileges for the selected source, in this case content provider 2. The modify access rights screen 410 may present the user with various options for modifying his or her access privilege to content provider 2, such as button 430 for purchasing content, button 440 for upgrading access privileges, and button 450 for canceling access privileges.

As an example, if the source is an electronic messaging service, then it may enable its consumers to communicate via any one or more of email, text messaging, instant messaging, or voice, in exchange for different levels of subscription plans. A consumer may use an interface like GUI 400 to upgrade his or her subscription plan with the electronic messaging service, simply by pressing button 440. In some implementations, the source aggregation site would then automatically update the consumer's account with the electronic messaging service, without the user necessarily having to navigate to the electronic messaging service, log in, and change the subscription.

Figure 5:
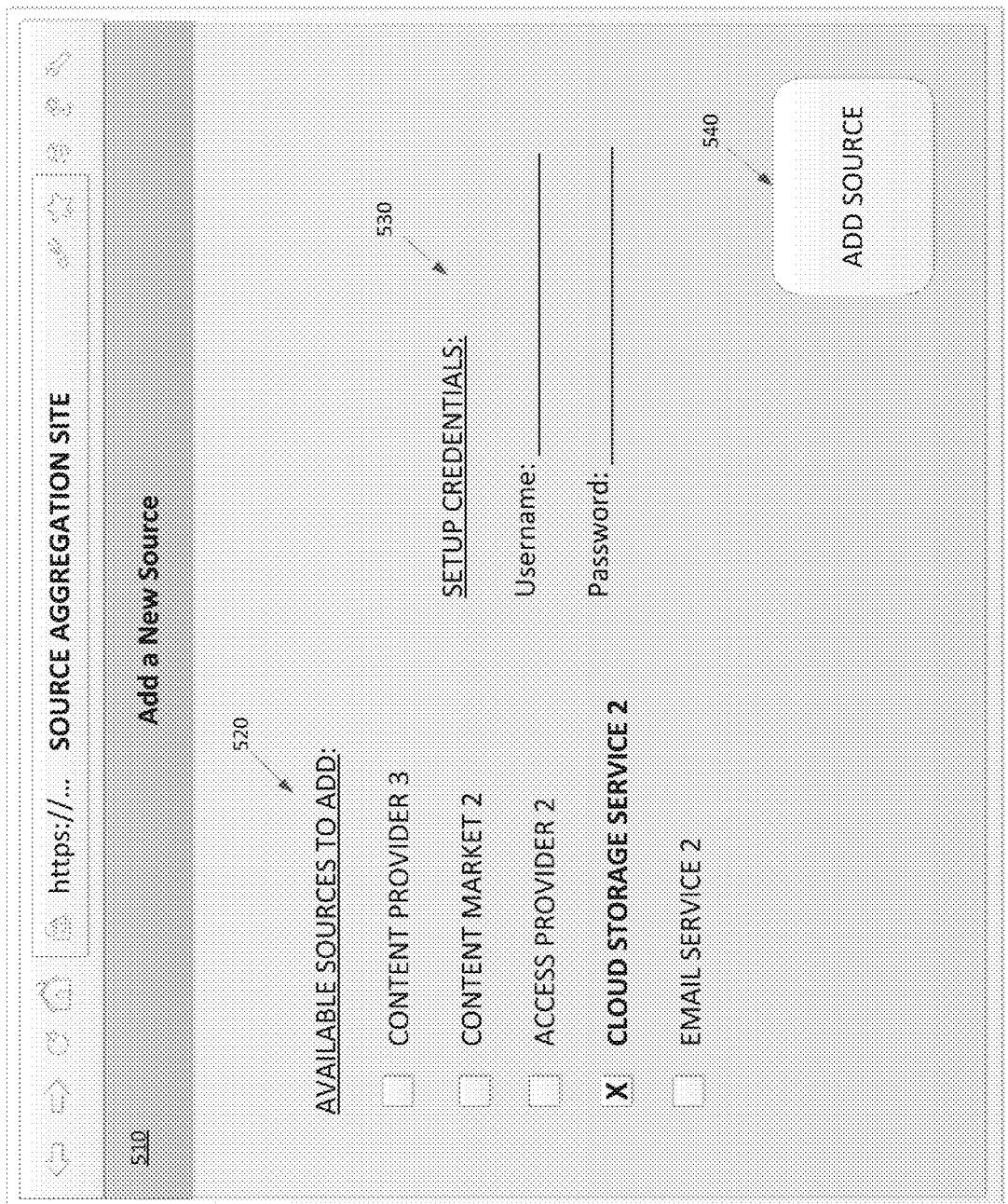
FIG. 5 is sketch of an example of a GUI for adding a new media content provider, according to some implementations.

FIG. 5 illustrates an example GUI 500 for adding a new source, according to some implementations. For example, GUI 500 may be presented to a consumer in response to the consumer selecting add new source button 370 in FIG. 3. In this example, the add new source screen 510 presents the consumer with a list 520 of possible sources that the consumer may not already have a relationship with. In some implementations, the list 520 may be personalized to the consumer, based on the consumer's preferences or browsing history. In this example, the consumer has selected to add the source corresponding to cloud storage service 2. The new provider screen 510 may also, in some implementations, request the consumer to perform a one-time set up of credentials for the newly selected source. When the consumer presses the add source button 540, the source aggregation computer system may communicate with the selected source, in this case cloud storage service 2, to establish a new account for the consumer using the credentials indicated in field 530.

It should be appreciated, however, that FIG. 5 is merely an illustrative example, and that implementations are not necessarily limited to the particular options shown in FIG. 5. In general, the source aggregation computer system may maintain different source rules for each source to determine particular ways of establishing new accounts for a consumer. For example, different sources may require different types of information from the consumer to establish a new account, and the source aggregation computer system may manage those different requirements and present them to the consumer in a seamless manner through the single-sign-on source aggregation site.

The foregoing examples in FIGS. 4 and 5 illustrate some non-limiting examples of how the disclosed system may facilitate a consumer's interaction with different sources of content and services. It should be appreciated, however, that these examples are illustrative in nature, and that implementations are not necessarily limited to the particular types of sources, content or services, or access privilege options shown in FIGS. 4 and 5. For example, it should be appreciated that implementations are not limited to media content. In general, the source aggregation site may provide a consumer with any suitable content and/or services, based on the consumer's specific access rights to different sources, and the source rules specified by the sources.

Figure 6:
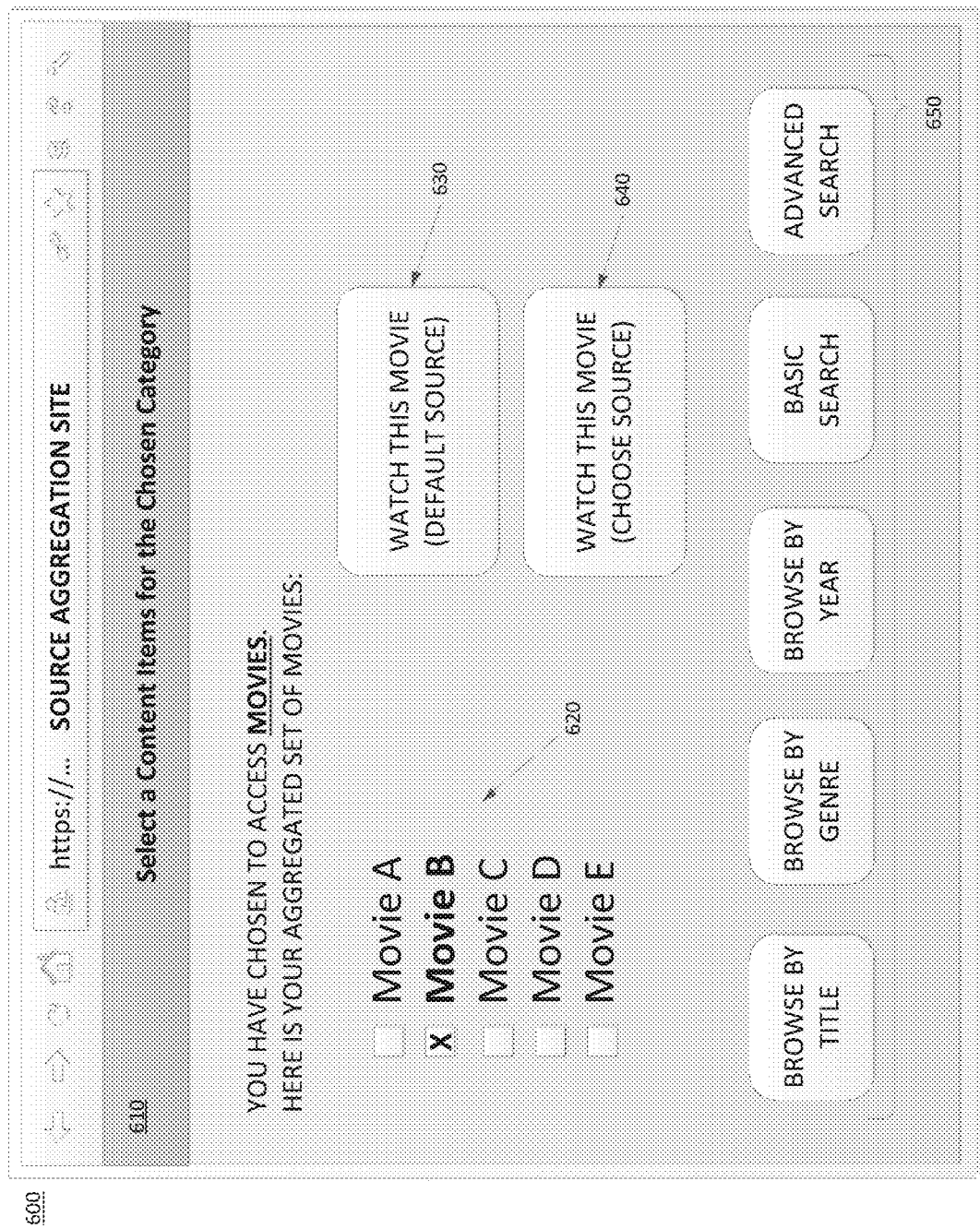
FIG. 6 is a sketch of an example of a GUI for selecting a specific content item to consume, according to some implementations.

FIG. 6 illustrates an example GUI 600 that presents a list of content items for a category that the user has selected (e.g., by selecting "Movies" from the list 220 in FIG. 2). In this example, the content items screen 610 presents a list 620 of content items, in this case movies, from which the consumer may select a particular content item. The movie selection screen 610 also enables the consumer to indicate whether to use a default source or to specify a particular source through which to consume the content item. In this example, an option button 360 is presented for watching the selected movie using a default source, which may be specified either by the consumer or by the source aggregation entity or by a source. In some implementations, an option button 640 may be presented for watching the selected movie through a source that the consumer can later specify. In some implementations, the movie selection screen 610 may provide further options 650 for browsing other types of content items, in this case movies.

It should be appreciated, however, that this is merely an illustrative example, and that implementations are not necessarily limited to movie content, or even to media content in general. The disclosed system may present to a consumer any suitable content or service through different types of sources that the user has relationships with. The source aggregation computer system may maintain different source rules for each source, and also maintain a rights profile for the consumer, to present a dynamically updated and personalized pool of content and services to the consumer.

Furthermore, although personalized content and service aggregation has been described above, it should be appreciated that implementations are not limited in this regard. In some implementations, aggregated content and services may be presented to the user with less personalization. One possible reason for presenting non-personalized content and services, or content and services beyond that which the user already has access, would be to allow the consumer to explore and discover new content and services. This may provide consumers with a richer pool of content and services from which to browse, and may also provide sources with the opportunity to market themselves to consumers.

Figure 7:
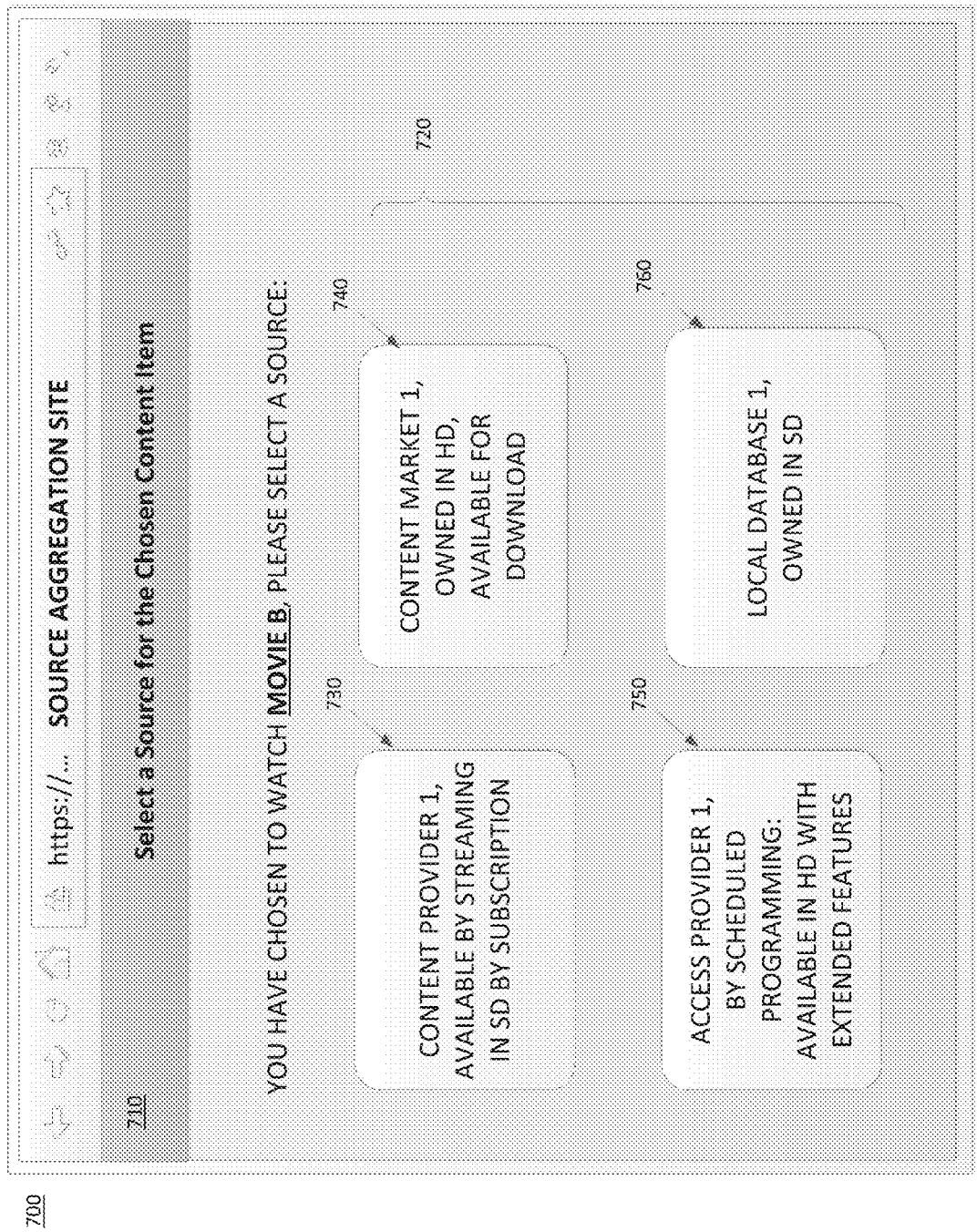
FIG. 7 is a sketch of an example of a GUI for selecting a provider through which to consume a specific content item, according to some implementations.

FIG. 7 illustrates an example GUI 700 for selecting a source through which to consume a specific content item, in this case movie B. For example, GUI 700 may be presented to the consumer in response to the consumer selecting the choose source button 640 in FIG. 6. In this example, a source option screen 710 allows the consumer to select a particular source through which to consume the content item, in this case movie B. A list of source options 720 may be provided to the consumer. In this example, the source options include an option button 730 for a subscription-based content provider, an option button 740 for a content market for purchased content, an option button 750 for an access provider for scheduled programming, and an option button 760 for a local database of stored content. In some implementations, each source may have its own access mechanism (in this example, streaming or download) and/or display format (in this example, High Definition HD or Standard Definition SD).

In some implementations, the list of source options 720 may be personalized to the consumer, based on the consumers rights profile and/or source rules that are dynamically updated and maintained by the source aggregation computer system providing the GUI 700. As such, the consumer may have single-sign-on access to various possible sources of a selected content item, without the consumer necessarily being required to authenticate with each source individually. Furthermore, in some implementations, as the consumer's access privileges for different sources change over time, the list of source options 720 may dynamically change as well. For example, if a user's subscription to content provider 1 expires, then the source aggregation computer system may detect the change, update the user's access rights for content provider 1, and may automatically update the list of source options 720 to not display the option button 730 for content provider 1. As such, a user is able to enjoy his or her collection of content and services from different sources via a seamless single authentication experience, without being required to individually manage his or her relationship with each source.

In some implementations, the source options that are presented to the consumer may include access options that are not available to the consumer unless the consumer makes an additional payment. This may provide an opportunity for the source aggregation entity to help its partners (i.e., content providers or, more generally, sources) to obtain further revenue. This may also allow the source aggregation entity to advantageously promote some content providers over others by providing a paid access option for the content item of interest from favored content providers and not providing a paid access option for the content item of interest from non-favored content providers (e.g., an option to purchase the desired song for $1.99 from Source A will be presented to the user instead of an option to purchase the desired song for $1.99 from Source B because Source A is a favored content provider and Source B is not). In some implementations, certain content providers or sources may be favored because they provided the source aggregation entity with valuable consideration (e.g., with payment in the form of, for example, revenue sharing) in exchange for the favored status.

Figure 8:
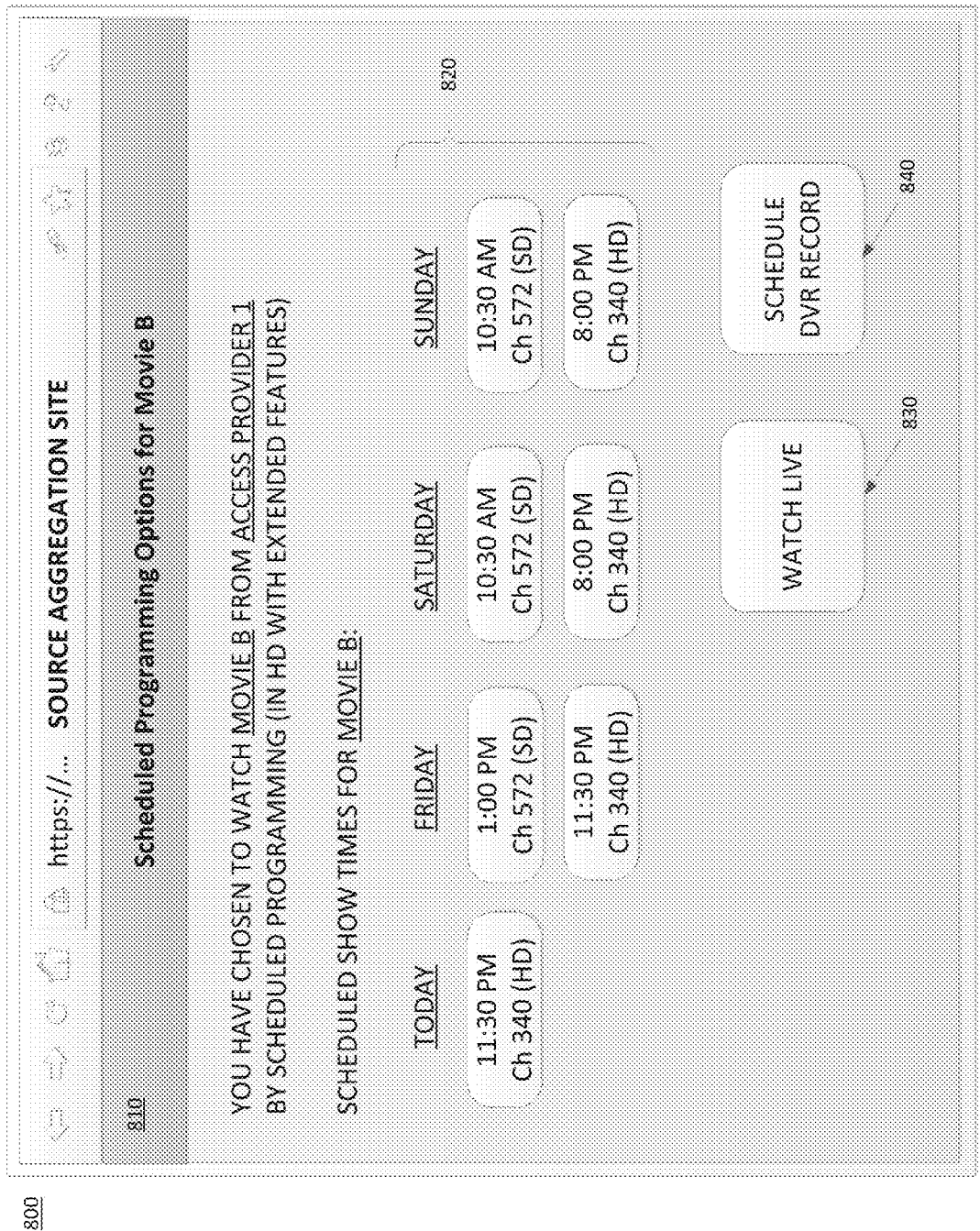
FIG. 8 is a sketch of an example of a GUI for selecting an option for scheduled programming content, according to some implementations.

FIG. 8 illustrates an example GUI 800 for selecting a consumption option for a chosen content item or service, in this case movie B. For example, GUI 800 may be presented to a consumer in response to the consumer selecting button 750 in FIG. 7, to watch movie B via access provider 1 by scheduled programming. In this example, a scheduled programming screen 810 presents a list of scheduled times and channels 820 from which the consumer may select to watch movie B. These options may be provided, for example, by a cable TV provider with which the source aggregation entity has a business relationship. Depending on the source rules for the cable TV provider, in some implementations, the scheduled programming options screen 810 may present an option 830 for the user to watch the movie live, and/or an option 840 to schedule recording of the movie for subsequent viewing by the user at a later time.

Although the foregoing FIGS. 1-8 have presented some examples of GUIs that enable a consumer to interact with, and consume content and services from, various sources, it should be appreciated that implementations are not limited to these examples. In general, the source aggregation site may present various types of content and services to a consumer, not necessarily limited to media content. For example, the source aggregation site may additionally or alternatively provide a consumer with an aggregated email service to access and manage different email accounts owned by the consumer. As another example, the source aggregation site may present an aggregated cloud storage service for the consumer, through which the consumer may access and manage different cloud storage service accounts owned by the consumer. As a non-limiting example, the source aggregation site may enable the consumer to increase storage options for email or cloud storage, or perform other account management activities for the different services, all from a single authentication platform.

Furthermore, in some implementations, the source aggregation site may be adaptive to the consumer's specific usage environment. For example, based on the particular device that the consumer is using, the source aggregation site may present content or services in different ways or modes. Such content or service consumption modes may also depend, in some implementations, on the user's rights profile and/or the source rules for the source that is providing the content or service. As such, the source aggregation site may be agnostic not only to the particular source of the content or service, but may also be agnostic to the particular device or environment in which the source's content or service is presented to the user.

As an illustrative example, in the context of media content, specifically movies, the source aggregation site may determine a particular display mode for a movie selected by the consumer. The display mode may depend, in some implementations, on source rules that have been specified by the source that provides the movie. For example, the particular source may specify that the movie should be presented in different ways depending on whether the consumer is using a particular type of device, operating system platform, language, etc. The source aggregation site may maintain these different rules, and implement them when presenting the movie to the consumer, in a transparent and seamless manner, so that the consumer enjoys a pleasurable viewing experience in watching the movie, and such that the source is provided the opportunity to tailor the presentation of its content to its consumers.

As a non-limiting example, in the context of media content, FIGS. 9A-9D illustrate four different modes of displaying a movie. It should be appreciated, however, that implementations are not required to have any particular type of consumption mode or type of content or service. In general, sources may specify any suitable consumption mode for any suitable type of content or service that can be consumed by a user, and the source aggregation site may dynamically update and implement those source rules in a seamless and transparent manner to the consumer.

Figure 9A:
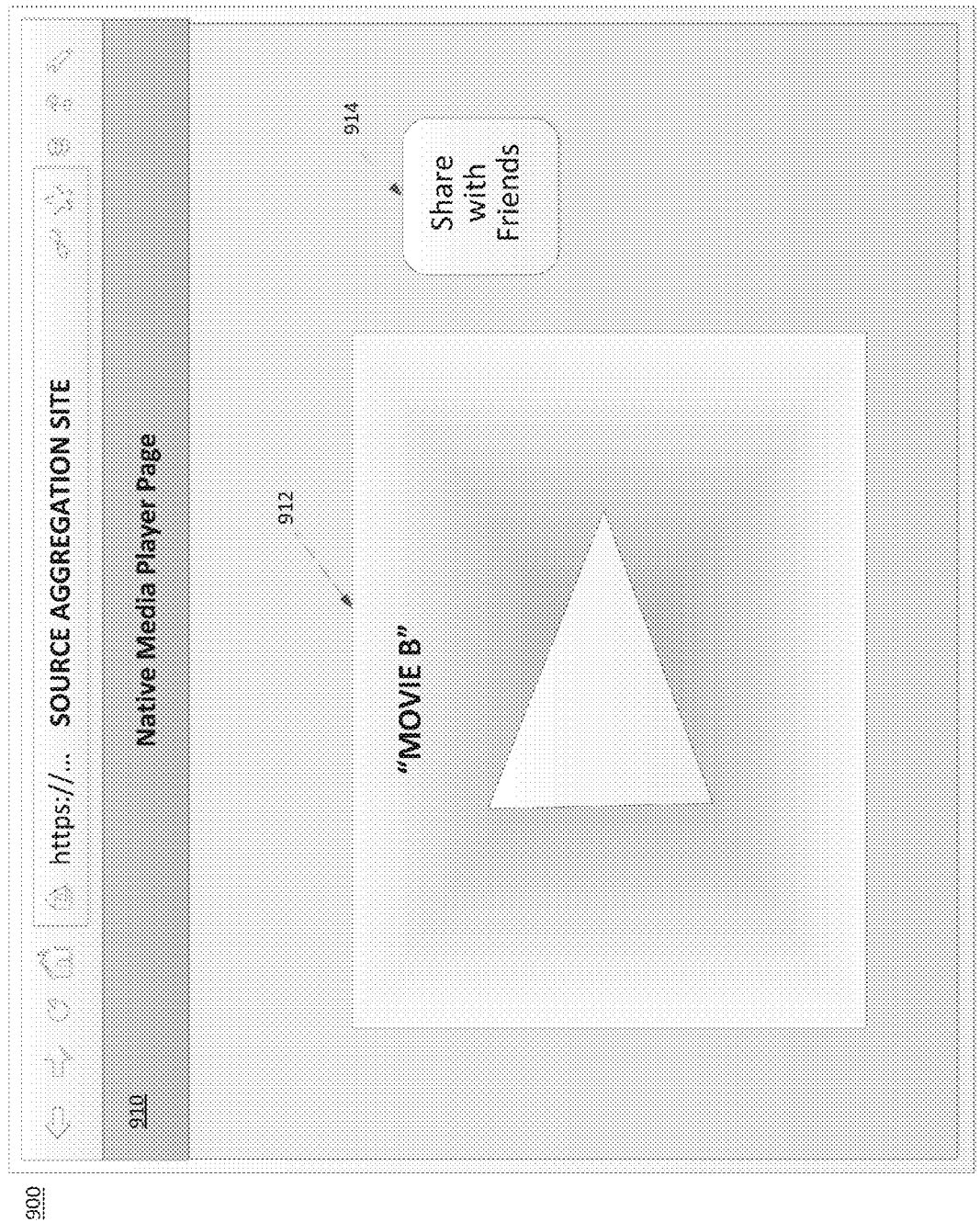
FIG. 9A is a sketch of an example of a GUI for watching a selected content item in a native media player within the source aggregation site, according to some implementations.

FIG. 9A illustrates an example GUI 900 for watching a selected content item, in this case movie B, in a native media player within the source aggregation site, according to some implementations. In this example, a native media player page 910 may have a native media player 912 that presents the movie B. The particular formatting and controls for the native media player 912 may be branded as part of the source aggregation site. In some implementations, the native media player display mode illustrated in FIG. 9A may be enabled by a particular business relationship between the source aggregation entity and the source providing the movie B. For example, the source may allow the source aggregation site to display the content item as rebranded content, in exchange for the source receiving certain privileges to promote its content and/or services on the source aggregation site.

Regardless of the specific business relationship, the source and the source aggregation entity may have an agreement to display movie B from the source within the native media player of the source aggregation site. This may be accomplished, for example, by the source transmitting the raw data of the movie directly to the source aggregation site (i.e., to the source aggregation computer system). In some implementations, the native media player page 910 may have other types of controls for the consumer to interact with the display content. For example, there may be a share with friends button 914 that the consumer can press to share movie B with one or more other people.

Figure 9B:
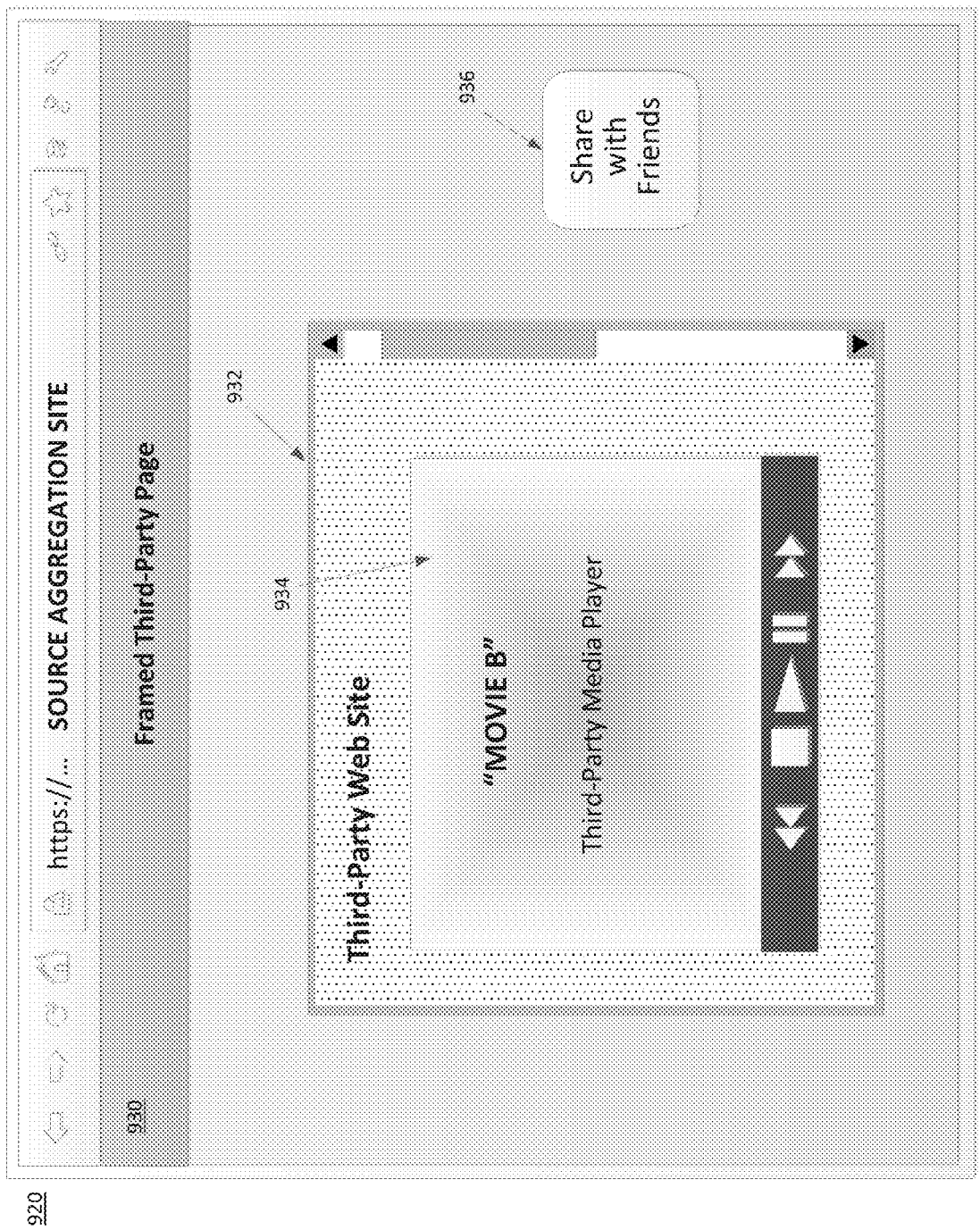
FIG. 9B is a sketch of an example of a GUI for watching a selected content item in a framed third-party media player within the source aggregation site, according to some implementations.

As another example of a possible consumption mode, FIG. 9B illustrates an example of a GUI 920 for watching a selected content item, in this case movie B, in a framed third-party media player within the source aggregation site, according to some implementations. In this example, a framed third-party page 930 may display a framed version of a third-party website 932 that has a third-party media player 934 for presenting a content item, such as movie B. In this example, a consumer may interact directly with the third-party website 932 to consume the content item movie B. However, the content item may still be displayed within the GUI 920, preserving at least a part of the seamless browsing experience for the consumer.

While some consumption modes, such as the framed display mode of FIG. 9B, may be less desirable to the source aggregation entity than other consumption modes, such as the native media player mode of FIG. 9A, the different types of consumption modes may enable the source aggregation site to present a broader variety of content items and services from sources that may not have the capability to transmit raw data to a native content/service consumption mode provided by the source aggregation site. Furthermore, if a consumer expresses a desire to consume a content item or service using the third-party source directly, then the source aggregation site may, in some implementations, be amenable to providing the content item or service using the third-party source's technology, such as by using the framed consumption mode shown in FIG. 9B. In this consumption mode, The source aggregation site may still have the ability to provide some native services, such as a share with friends button 936 that allows the consumer to share the content item movie B with other people. As such, by providing different possible modes for the user to consume content and services from different sources, it affords the source aggregation site the flexibility to develop different business relationship with sources, to handle different types of technologies operated by the sources, and also to satisfy different preferences of the consumers themselves.

Figure 9C:
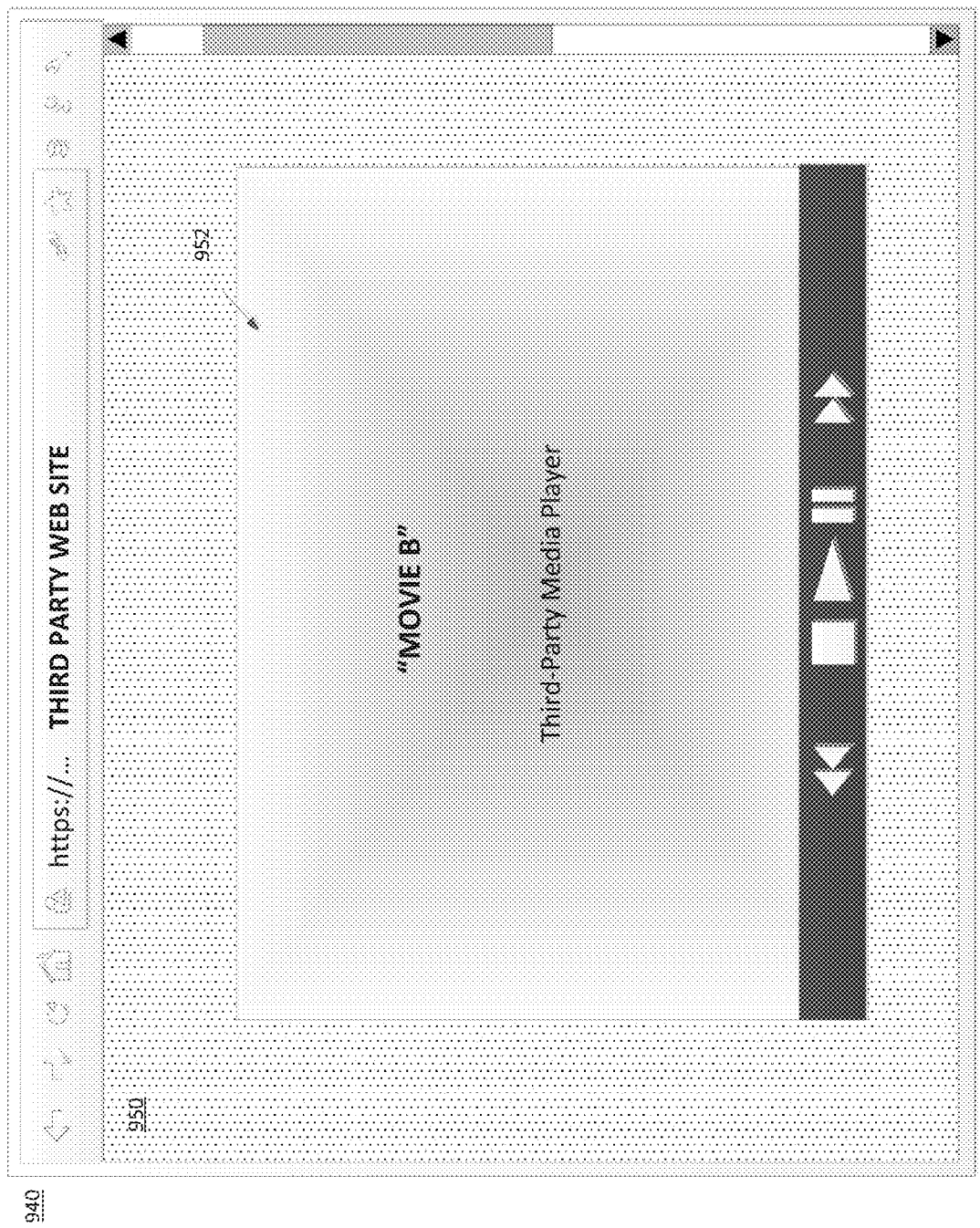
FIG. 9C is a sketch of an example of a GUI for watching a selected content item in a third-party web site external to the source aggregation site, according to some implementations.
Figure 9D:
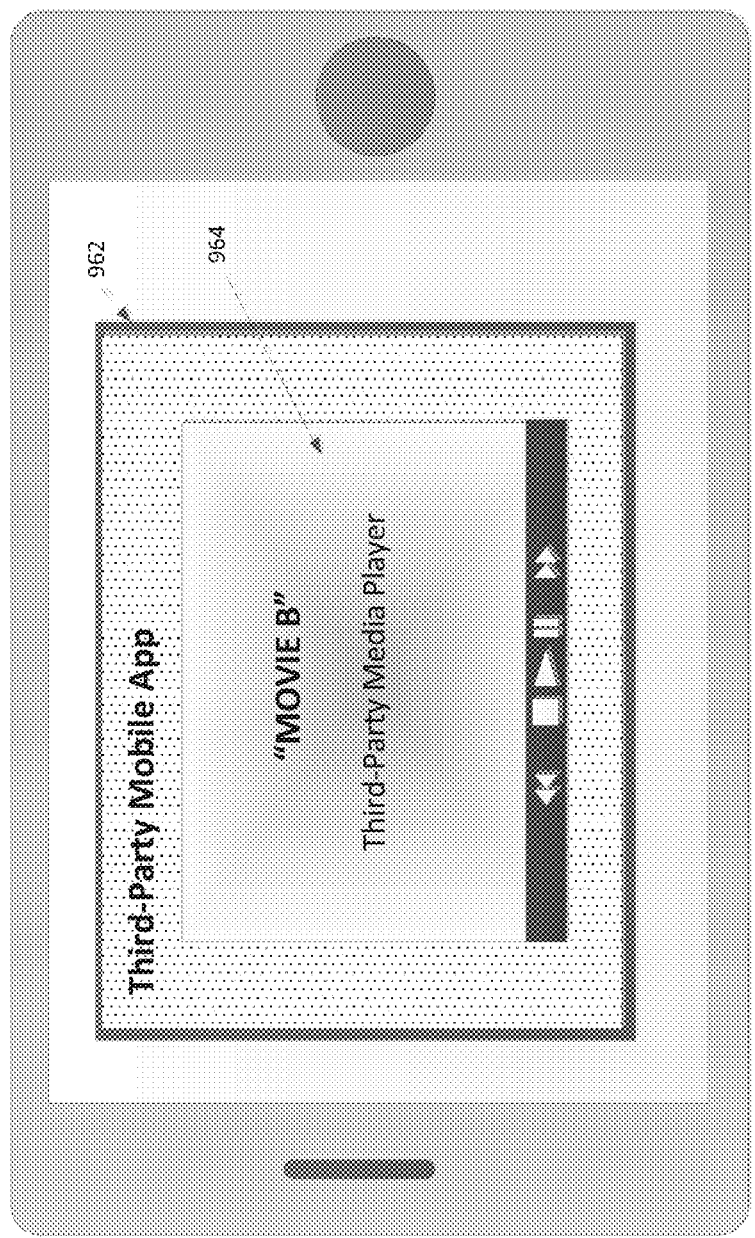
FIG. 9D is a sketch of an example of a GUI for watching a selected content item in a third-party mobile application external to the source aggregation site, according to some implementations.

As yet other examples of consumption modes, the source aggregation entity may present a content item, such as movie B, to a consumer by launching or redirecting to an external application, such as a different website (FIG. 9C) or a mobile app (FIG. 9D). In FIG. 9C, the GUI 940 may present a third-party website 950 operated by the source providing the content item, in this case movie B. The third-party website 950 may display the third-party movie player 952 that is operated by the source of the content item, in this case movie B.

In FIG. 9D, the GUI 960 may be a mobile application 962 that is launched on a mobile device. For example, a third-party mobile app 962 may display a third-party media player 964 for displaying a content item, in this case movie B. The third-party mobile app 962 may be launched, for example, if the source aggregation site determines that other options for displaying the content item movie B would not be effective on the particular device used by the consumer. It should be appreciated, however, that regardless of the reasons for offering different consumption modes, the source aggregation site may have access to source rules for each source, and the source rules may specify a particular consumption mode that is desired by the source for different consumption environments and/or different content items and services. As such, the source aggregation site may be able to dynamically adapt to whatever source is presenting a particular content item or service, to provide a consumer with the seamless content and service consumption experience across a variety of sources.

FIGS. 9A-9D have presented some non-limiting examples of consumption modes that may be presented to a consumer by the source aggregation computer system for a selected content item or service, in this example a movie. The particular consumption mode that is presented may depend on various factors, including but not limited to, the computing environment of the consumer (e.g., type of device, type of operating system, etc.) and the source rules specified by the source providing the content. In some implementations, if the source aggregation computer system determines that no consumption mode is compatible with the consumer (e.g., due to the consumer's personal characteristic, such as age, or the consumer's computing environment, such as computing device or operating system), then the source aggregation computer system may determine to not present a particular content item or service to the consumer (i.e., censor that content item or service). This censoring may happen at any suitable step, for example when the content item or service is to be consumed by the consumer, or when a list of aggregated content items and/or services is presented to the consumer. As such, the source aggregation computer system may dynamically adapt the consumption experience based not only on the consumer, but also based on the source and how it wishes to interact with a particular consumer for a particular content item or service.

Figure 10:
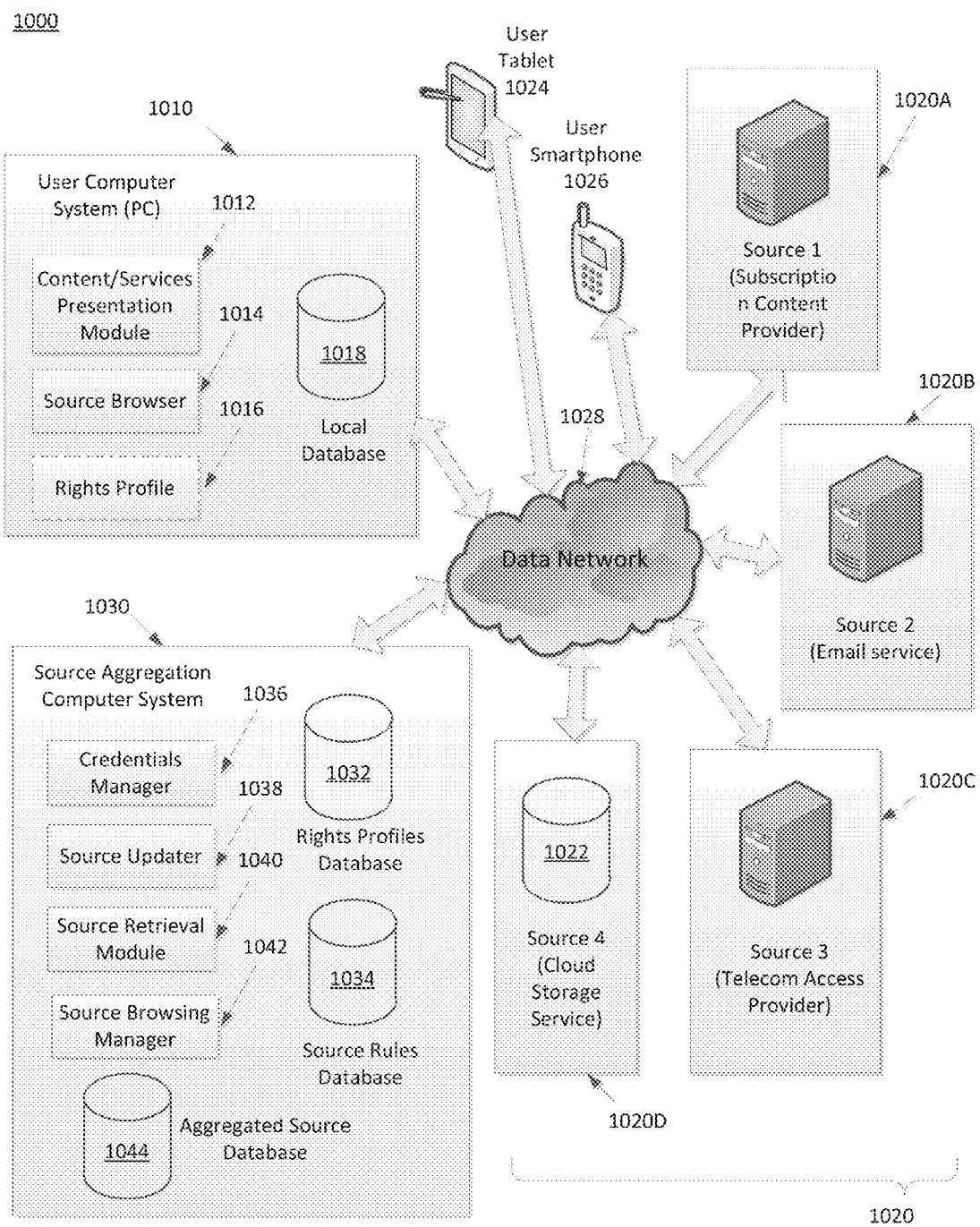
FIG. 10 is a block diagram of an exemplary system for managing, aggregating, and presenting content and services from different sources, according to some implementations.

FIG. 10 is a block diagram of an exemplary source aggregation computer system 1000 for managing, aggregating, and presenting content and services from different sources, according to some implementations. The source aggregation computer system 1000 includes a user computer system 1010 that is configured to enable a user to browse, select, and consumer various types of content and services from various sources, such as source computer systems 1020. In the exemplary system 1000 shown in FIG. 10, the source computer systems 1020 include a subscription content provider computer system 1020A that is configured to enable a user to access his or her subscription to content (e.g., a collection of media content) managed by Source 1, an email service provider computer system 1020B that is configured to enable a user to access email and communication services managed by Source 2, a telecommunications (telecom) access provider computer system 1020C that is configured to enable a user to access scheduled or on-demand programming managed by Source 3, and cloud storage service computer system 1020D that is configured to enable a user to access remote cloud-based storage 1022 managed by Source 4.

It should be appreciated that users may access the different sources 1020 using any suitable computing device, including but not limited to, a desktop computer, a laptop computer, a user tablet 1024 or a user smartphone 1026. Regardless of the exact nature of the device that the user utilizes, the user's device may communicate with the source computer systems 1020 via a data communications network, such as network 1028, which may be the Internet, or a local area network (LAN), or any suitable communication network, not limited to any particular type of network or communication medium.

The user computer system 1010 is an electronic device configured with hardware and software that enables the device to interface with a user and run hardware and software applications to perform various processing tasks. The sharing user computer system 1010 may be a Smartphone, a tablet computer, a notebook computer, a laptop computer, a digital video recorder, an e-book reader, a music player, a desktop computer or any other appropriate portable or stationary computing device. The sharing user computer system 1010 may include one or more processors configured to execute instructions stored by a computer readable medium for performing various client operations, such as input/output, communication, data processing, and the like. For example, the sharing user computer system 1010 may include or communicate with a display and may present information to a user through the display. The display may be implemented as a proximity-sensitive or touch-sensitive display (e.g. a touch screen) such that the user may enter information by touching or hovering a control object (for example, a finger or stylus) over the display.

The sharing user computer system 1010 includes a content/services presentation module 1012 that may, for example, be embodied in a program module or an application resident in the computer system 1010 that is configured to enable a user to access and consume content and services provided by one or more of the source computer systems 1020. In some implementations, the content/services presentation module 1012 may be, for example, a media player that is used to access media content. The content/services presentation module 1012 may, in some implementations, be source-specific. For example, if the content/services presentation module 1012 is a media player, then it may be a particular type of media player associated with particular media sources for accessing their respective media content. In other implementations, the same content/services presentation module 1012 may be used to access the content and services of multiple or all of the sources 1020 in the system 1000.

The user computer system 1010 may further include a source browsing module 1014 that may work in concert with the content/services presentation module 1012 to enable the user to browse, select, and consume content or services. In some implementations, the source browsing module 1014 may be a separate software application from the content/services presentation module 1012, or may be part of the same software application as the content/services presentation module 1012. For example, the content/services presentation module 1012 may be, in some implementations, a native media player (e.g., native media player 912 in FIG. 9A), and the source browsing module 1014 may be a web browser providing a GUI (e.g., GUI 800 in FIG. 8). Though, it should be appreciated that implementations are not limited in this regard, as the source browsing module 1014 may be any suitable application configured to enable a user to browse, select or consume content and services.

The source browsing module 1014 also may be configured to facilitate interactions between the user computer system 1010 a source aggregation computer system 1030. For example, the source browsing module 1014 may store authentication credentials of the user of the user computer system 1010 for accessing the content and services offered through the source aggregation computer system 1030. The source browsing module 1014 also may facilitate access by the source aggregation computer system 1030 to the user's rights profile data store 1016, which may be optionally included in the user computer system 1010 (though, in some implementations, the rights profile data store may be in the source aggregation computer system 1030 or in any other suitable location). In some implementations, the source browsing module 1014 includes all or most of the code used to display various web pages hosted by the source aggregation computer system 1030 (e.g., the GUIs of FIGS. 1-8) with some or all of the specific data used to populate the pages being received from or through communications with the source aggregation computer system 1030.

The user rights profile data store 1016 may be a computer data store that is configured to store the user's rights profile. The user's rights profile may include information about the user and his or her access rights to various content and services from different sources. The user's rights profile may include authentication credentials used by the user to access different source computer systems, such as source computer systems 1020. As such, the user's rights profile may contain sensitive information that a user may prefer to have stored locally in the user's computer system, or in a secure remote location, for example, at the source aggregation computer system 1030 in a rights profile database 1032. The information included in a user's rights profile is described in more detail below. In some implementations, the source browsing module 1014 of the user computer system 1010 may periodically (e.g., hourly, daily, or at every power-up of the computer) or on a demand-basis (e.g., in response to the user launching an application) and autonomously from or in collaboration with the source aggregation computer system 1030 communicate with the source computer systems 1020 to update the user's access rights information.

The source computer systems 1020 may be computer systems configured to enable users to access any suitable content and services. The source computer systems 1020 may each be specific to a particular source that offers its contents or services to users. In some implementations, the source computer systems 1020 may each provide its own content or service consumption mode to be used by the user computer system 1010 to access and consume content and services provided by the source computer system. In some implementations, the content consumption mode may be a web site or a mobile application, or any other suitable mode of presenting content or services to a user.

In some implementations, the source aggregation computer system 1030 may serve as a single authentication source by which the user computer system 1010 may interact in different ways with the source computer systems 1020, for example, to setup accounts through a registration process, and manage and process user payments for access to the content and services provided by the sources. Some or all of the source computer systems 1020 may require user authentication prior to enabling users to access content and services managed or stored by the source computer systems 1020. The source aggregation computer system 1030 may communicate with the source computer systems 1020 to acquire information about the access rights of users and about the collection of content and services that the source computer systems 1020 make available to users.

In some implementations, the source computer systems 1020 may share a same set of shared content and/or services. As such, the source aggregation computer system 1030 may be able to detect such commonalties, and present a user with a list of available sources that commonly offer a given content item or a given service, to allow the user to select a preferred source by which to access the particular content item or service.

The source aggregation site 1000 is a computer system consisting of a single computer or a collection of computers that are individually or collectively configured to facilitate interaction between user computer system 1010 and source computer systems 1020.

In some implementations, a user must authenticate himself or herself as a registered user of the source authentication computer system 1030 prior to being presented with an access options GUI (e.g., the GUIs in FIGS. 2-9D). The user may authenticate himself or herself by providing authentication credentials, such as, for example, a user identifier and a password. In some implementations, the user is presented with a login page (e.g., GUI 100 of FIG. 1) and the user may then manually input a user identifier and a password into a user identifier field and a password field of the login page. In some implementations, one or more of the source computer systems 1020 may automatically provide a stored user identifier and a password to the source aggregation computer system such that the user is automatically authenticated in a manner that is transparent to the user. In these implementations, the user is presented with the access options GUI (e.g., the GUIs in FIGS. 2-9D) immediately upon selecting a particular category, content item or service. Some or all of these functions may be facilitated by a credentials manager module 1036.

If the user is not a registered user of the source aggregation computer system 1030, then the source aggregation computer system 1030 may present to the user a new account creation GUI (e.g., GUI 100 of FIG. 1, using button 150) with which the user may interact to create a media sharing account with the source aggregation computer system 1030. The new account creation GUI may prompt the user to input identifying information (e.g., full legal name, physical address and e-mail address) and to select a user identifier and a password to be used by the user to subsequently access the account with the source aggregation computer system 1030. In some implementations, the user may utilize an existing account via a social networking service or content/service sharing service. After the user-inputted identifying information has been authenticated, the source aggregation computer system 1030 may create an account for the user that enables the user to take advantage of the source aggregation services offered by the source aggregation computer system 1030.

As part of the account setup process, the source aggregation computer system 1030 may present to the user an access rights GUI that prompts the user to identify the different sources that provide the user with access to content and services. For example, the user may indicate that he or she currently accesses content and services from an online cloud storage service (e.g., Source 4 managing source computer system 1020D) or his or her local cable television provider (e.g., Source 3 managing source computer system 1020C). In some implementations, the user may provide authentication credentials (e.g., a user identifier and a password) to the source aggregation computer system 1030 for some or all of the identified sources. In some implementations, the source aggregation computer system 1030 may use the provided authentication credentials to access the source computer systems of the respective sources (e.g., computer systems 1020C and 1020D) on behalf of the user and to request or determine the user's access rights to the content and services provided by the different sources.

Though, as mentioned in the foregoing, it should be appreciated that the authentication process with some sources may be largely automated without the need for a user to provide his or her credentials to source aggregation computer system 1030. For example, in some implementations, the source aggregation computer system 1030 may receive a user's credentials from a source computer system, based on general identifying information (e.g., name and address) about the user that the source aggregation computer system 1030 may send to the source.

Sources may offer users different levels of access (also referred to as access rights) to their content or services. For example, in the context of services being online email services, and the source being an online email provider, the email provider may provide a user with a limited set of communication features and/or a limited amount of email storage in exchange for establishing a free account. When the user upgrades to a paid account, or to higher levels of paid account, then the email provider may allow the user to access a richer set of features, such as more storage space or advanced emailing and voicemail features.

As another example, in the context of services being online cloud storage services, and the source being a cloud storage service provider, the cloud storage service provider may provide a user with a limited amount of cloud storage and/or limited set of cloud storage accessibility features in exchange for establishing a free account. When the user upgrades to a paid account, or to higher levels of paid account, then the cloud storage provider may allow the user to access a richer set of features, such as accessibility from mobile devices or more cloud storage space.

As another example, in the context of content being media content, the source may be a media provider and the content item may be a piece of media content. Some media providers may give a user the right to access all or a portion of their library of media content for free and may even give the user the right to access the content without requiring the user to setup an account with the media provider (e.g., YOU-TUBE®).

As another example, in the context of media content, some media providers allow users to select and purchase the different pieces of media content included in the media provider's library by interacting with a store interface (e.g., a web page store interface) in a manner that is the electronic equivalent of a user selecting and purchasing pieces of media content embodied in physical items (e.g., DVDs or CDs) from a brick and mortar store. These media providers provide the user with an ownership access right to the purchased pieces of media content that allows the user to subsequently log into their account with the media provider to obtain generally unfettered and repeated access to their purchased pieces of media content without requiring further payment from the user. The user is thereby able to create his or her own, personal library of media content that is maintained for the user by the media provider.

As another example, in the context of media content, some media providers allow users to select and rent different pieces of media content included in the media provider's library for a limited period of time (e.g., for 48 hours) or for a limited number of uses. These media providers may give the user access rights to the piece of media content for the rental period that are then rescinded after expiration of the rental period or that are rescinded after the user accesses the piece of media content a predetermined number of times.

As another example, in the context of media content, some media providers allow users to setup a subscription relationship with the media providers in order to access their library of media content (e.g., NETFLIX®). These media providers condition the right to access all or a portion of their library of media content on the user continuing to provide further compensation (e.g., payments) to the media provider over time. These media providers may setup an account for the user that enables the user to access the pieces of media content conditioned on the user continuing to provide the further compensation requested by the media provider. If the user has not provided the necessary compensation, the user's subscription may expire and, consequently, the user's right to access the pieces of media content may be rescinded. If desired, the user may resurrect an expired subscription at a later date by providing the appropriate compensation to have the user's access rights reinstated.

As another example, in the context of media content, some media providers enable users to store pieces of media content provided by the media provider locally on the user's own computer system (e.g., on the user's digital video recorder (DVR), on the hard-drive of the user's personal desktop or tablet/mobile computer, or in the memory of the user's Smartphone). In some implementations, the media provider allows users to enjoy an ownership interest with unfettered access rights to the locally stored pieces of media content. In some implementations, the media provider restricts the access rights to the locally stored pieces of content based, for example, on a subscription relationship or on a rental relationship.

As another example, in the context of media content, some media providers offer a combination of the above-described different access rights to their library of media content. For example, some media providers allow a user to purchase any piece of media in their library of content (e.g., the instant video store offered by AMAZON.COM®), allow a user to access a portion of their library for free (e.g., kids shows, publicly funded educational shows, or promotional shows like infomercials), and allow a user to subscribe to access a different portion of their library (e.g., a "Prime" subscription membership offered by AMAZON.COM®). Some media providers may only offer a single level of access to their library of media content. For example, some media providers do not allow users to purchase or rent pieces of media content but do allow users to get access to the pieces of media content in their library by setting up a subscription relationship with the media provider.

The source aggregation computer system 1030 may generate a rights profile for the user as part of the account setup process that may be stored in a data store that is local to the source aggregation computer system 1030 or that is stored on the user computer system 1010, or at any suitable location. For example, the rights profile may be stored in the rights profiles database 1040 of the source aggregation computer system 1030.

In some implementations, the rights profile may include demographic information about the user (e.g., age) or security level information about the user that may be leveraged to modify the user's access rights as described previously.

The rights profile also may include preferences selected by or for the user that identify the user's default access options for consuming content and services and/or preferences selected by or for the user that are used to automatically identify other users that will receive content and services shared by the user. The rights profile also may include a group of sources that the user has identified as being available to the user for the purpose of accessing content and services. For those sources that require user authentication as a pre-condition to access, the rights profile may also contain corresponding authentication credentials of the user.

In some implementations, the source aggregation computer system 1030 communicates with each source computer system 1020 and, if necessary, provides the user's authentication credentials to the source computer system, or alternatively receives the user's authentication credentials from the source computer system, in order to obtain specific information about the user's relationship with the source that is then stored in the user's rights profile. Since the user's relationships with different sources may change over time, the source aggregation computer system 1030 may update the user's rights profile information periodically (e.g., daily, weekly, or hourly) or on-demand (e.g., in response to and upon a user selecting a content item or service). Such actions may be performed, in some implementations, by a credentials manager module 1036.

In some implementations, the information stored in the user's rights profile may indicate whether the user has a subscription relationship with a source and, if so, what type of subscription relationship (e.g., a premium subscription or a standard subscription). In some implementations, the source aggregation computer system 1030 stores groups of content item identifiers and/or service identifiers corresponding to all of the content items and services that a given source enables subscribing users to access for different subscriptions (e.g., a large group of content identifiers for a premium subscription with the media provider and a smaller group of content item identifiers for a basic subscription). These groups of content item identifiers and service identifies may be periodically updated by the source aggregation computer system 1030 by polling or otherwise communicating with the different sources to identify the different content items and services that are accessible for different types of subscriptions.

In the example of content being media content, in some implementations, the information stored in the user's rights profile includes content item identifiers for content items that the user has in his or her personal library with the media provider. The information also may include shared media content identifiers of each of the pieces of content that the user can currently access under a rental relationship with the media provider. The information also may include information that allows the source aggregation computer system 1030 to remotely access the local storage device of the user (e.g., DVR or computer hard drive) to determine what pieces of media content are available to be accessed by the user from local storage.

In some implementations, the source aggregation computer system 1030 may determine the access rights of a user to a particular content item or service by comparing the identity of the content item or service with those identifiers that have been previously designated by the source aggregation computer system 1030 in the user's rights profile as being accessible. For example, the designation of accessibility may have been made through prior communications with sources. If the identity of a content item or a service is included in the list of identifiers previously designated by the source aggregation computer system 1030 for a particular source as being accessible to the user, then the source aggregation computer system 1030 may include in the offered set of access options an option to access the particular content item or service from the particular source.

In some implementations, the source aggregation computer system 1030 may determine the access rights of a user to a particular content item or service by dynamically accessing some or all of the different sources identified in the user's rights profile in response to and upon receipt of a communication from the user computer system 1010 indicating that the user has selected the particular content item or service. In these implementations the source aggregation computer system 1030 may use the authentication credentials of the user to authenticate itself with a given source's computer system and may, thereby, collect information from the source's computer system that enables the source aggregation computer system 1030 to determine, in real-time, whether the user has access to the particular content item or service from that source. If the user does have access, then a corresponding access option may be included in the set of access options presented to the user. Conversely, if the user does not have access, then no such access option is included in the set of access options presented to the user.

In some implementations, the source aggregation computer system 1030 may identify access options for all versions or forms of a particular content item or service for presentation to the user. In some implementations, the source aggregation computer system 1030 may restrict the set of available access options presented to the user to a smaller set of access options based on user preferences or source preferences.

In some implementations, specific rules may be established by one or more sources for accessing content and services. These rules may be stored by the source aggregation computer system 1030 in a source rules database 1034. These rules may include, but are not limited to, specific modes of consumption by which a user is allowed to access a particular content item or service, access policies for types of users (e.g., based on age, location, etc.), or other policies that the source may specify to regulate its interactions with users through the source aggregation computer system 1030.

In some implementations, the source aggregation computer system 1030 identifies a single default access option to be used to access the content item or service, based on the user's or the source's default access option preferences and automatically presents the user with the content item or service from the default source, in a manner that is transparent to the user. In other words, upon and in response to the user selecting the content item or service, the user is presented with a content or service consumption interface (e.g., GUI 900 of FIG. 9A in the example of content item being a movie) with which the user may interact to consume the content item or service. In some implementations, a source updater module 1038 may dynamically update the list of accessible sources to the user, based on the user's rights profile and/or the source rules in 1034. A source retrieval module 1040 may facilitate retrieving content and services from different sources, respecting the particular communication and interaction protocols that each source requires for accessing content. A source browsing manager module 1042 may facilitate a user searching through sources and/or content items and services provided by sources. An aggregated source database 1044 may store a list of accessible sources for the user, and/or a list of sources not accessible by the user but which may be of interest to the user.

The system 1000 may also enable users to communicate electronic messages with each other through the data network 1028. The network 1028 may involve any computer system that supports the generation and delivery of electronic messages between users. Various computer systems in the network 1028 may operate in response to instructions provided by a communications application, which may be resident on the user's computer systems (e.g., 1010, 1024, 1026). In one implementation example, the network 1028 may include a social networking computer system that enables users to send to each other messages having user-selectable sharing links that appear, for example, in the news feeds of the users. In another implementation example, the network 1028 may include any one of an e-mail communications system, an instant messaging communications system, a text messaging communications system, or a unified messaging communications system.

The data network 1028 is configured to enable electronic communication between all of the computer systems included in the system 1000. The data network 1028 may include a circuit-switched data network, a packet-switched data network, or any other network able to carry data, for example, Internet Protocol (IP)-based or asynchronous transfer mode (ATM)-based networks, including wired or wireless networks. The network 1028 may be configured to handle web traffic such as hypertext transfer protocol (HTTP) traffic and hypertext markup language (HTML) traffic. The network 1028 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

FIGS. 11-14 illustrate various processes involved in aggregating and managing content and services from different sources. For convenience, the process in each of FIGS. 11-14 references particular componentry described with respect to FIG. 10. However, similar methodologies may be applied in other implementations where different componentry is used to define the structure of the system, or where the functionality is distributed differently among the components shown in FIG. 10.

Figure 11:
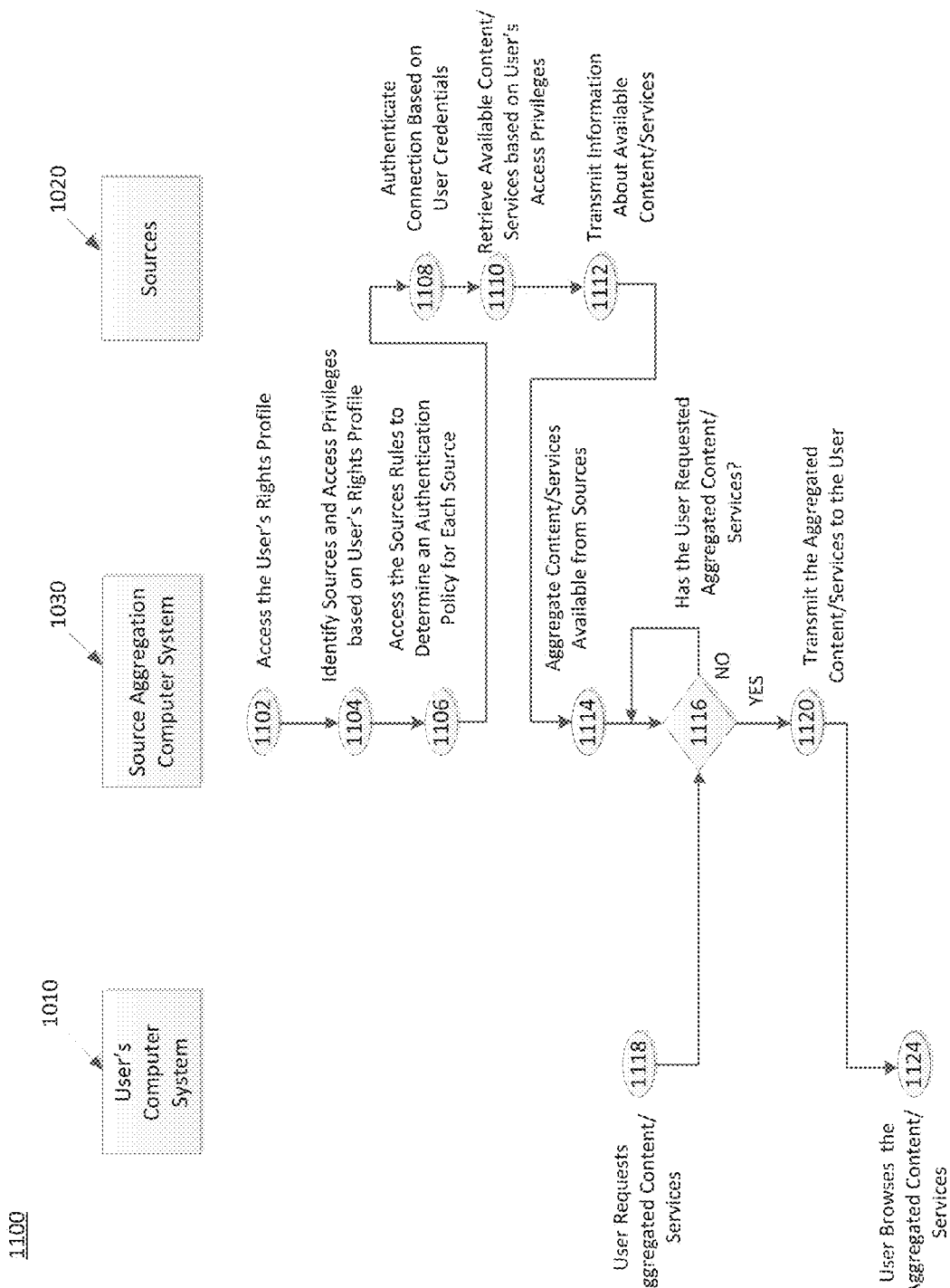
FIG. 11 is a flow diagram of an exemplary process for aggregating personalized content and services from multiple sources and presenting the aggregated personalized content and services to a user, according to some implementations.

FIG. 11 is a flow diagram of an exemplary process 1100 for aggregating content and services from multiple sources and presenting the aggregated content and services to a user, according to some implementations. The source aggregation computer system 1030 may, at any suitable time and with any suitable frequency, access a user's rights profile (1102). Based on the user's rights profile, the source aggregation computer system 1030 identifies one or more of the sources 1020 and the corresponding access privileges that are associated with the user (1104). The source aggregation computer system 1030 may access source rules for one or more of the sources 1020, to determine at least an authentication policy that each of the identified sources of the sources 1020 has specified for the user (1106). As non-limiting examples, the authentication policy may specify a frequency with which the user's credentials should be verified with the sources 1020, or the type of credentials that should be presented to the sources 1020, or any other suitable requirement that the sources 1020 have specified in verifying the users credentials.

One or more of the sources 1020 that are identified in the user's rights profile may authenticate the requested connection based on the user's credentials (1108), retrieve available content items or services based on the user's access privileges (1110), and transmit information about those content items or services to the source aggregation computer system 1030 (1112). The source aggregation computer system 1030 may collect content items and services from each of the identified sources of sources 1020 and aggregate the content items and services that have been authenticated for the user (1114). It should be noted, however, that while this example illustrates a scenario in which the source aggregation computer system 1030 presents only authorized content items and services to a user, implementations are not limited in this regard. In some implementations, the aggregated pool of content items and services that are presented to a user may include content items and services for which the user does not have authorization to access. The latter may be useful, for example, to help the user discover new content and services from existing sources, and/or from entirely new sources that the user does not have any existing relationship with. For example, if a user has a standard subscription with a particular content provider, then in addition to the standard content and services available to the user, the source aggregation computer system 1030 may also present some content items and services from a higher subscription level, to facilitate the user's discovery of new content/services and to help promote different types of contents and services provided by the source.

Regardless of the exact nature of the group of sources in sources 1020 from which the source aggregation computer system 1030 aggregates content items and services, the aggregated content items and services may, in some implementations, be locally stored in the source aggregation computer system 1030 for fast presentation to the user's computer system 1010 upon request. Though, it should be appreciated that implementations are not limited to locally storing aggregated content items and services at the source aggregation computer system 1030, as the aggregated content items and services may be stored in any suitable location accessible by the source aggregation computer system 1030, or may not be stored at all and may instead be aggregated on an on-demand basis in response to requests by the user's computer system 1010.

In some implementations, if the source aggregation computer system 1030 determines (1116) that a user's computer system 1010 has requested aggregated content (1118), then the source aggregation computer system 1030 may transmit the aggregated content to the user's computer system 1010 (1120). It should be appreciated that, in some implementations, the foregoing authentication and aggregation steps (e.g., 1102-1114) may be performed at this point (e.g., after 1116) upon receiving a request from the user's computer system 1010. Regardless of the exact timing and frequency of the authentication of a user and aggregation of content items and services for the user, the source aggregation computer system 1030 may transmit the aggregated content items and services to the user (1120), and the user's computer system 1010 may enable the user to browse the aggregated content (1122). For example, the aggregated list may be presented to a user by an appropriate GUI (e.g., GUI 600 of FIG. 6, in which a list of movies 620 is presented). Though, it should be appreciated that implementations are not limited to a particular type of content, and may aggregate any suitable content or service.

Figure 12:
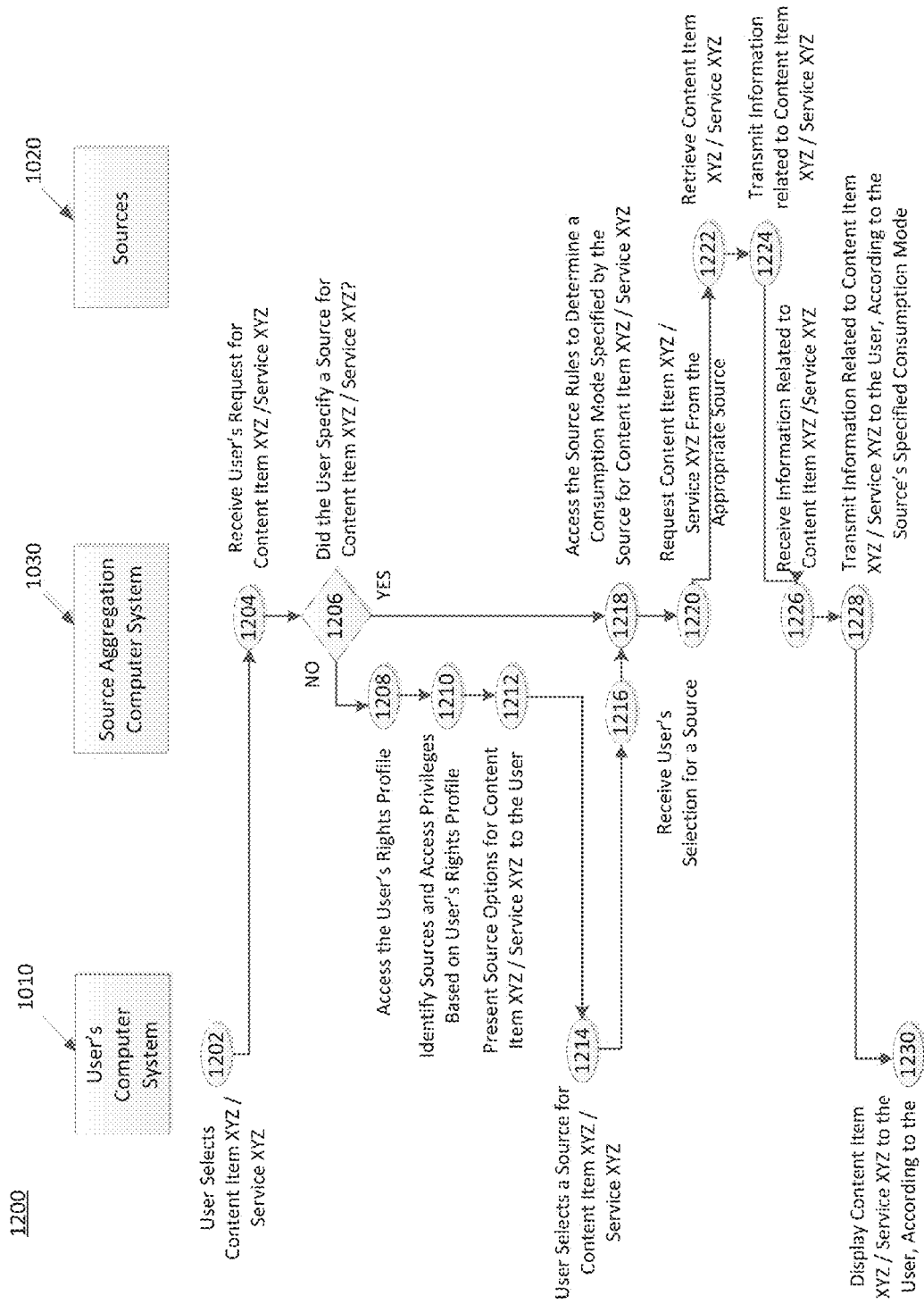
FIG. 12 is a flow diagram of an exemplary process for determining appropriate sources for content, and presenting content from the appropriate sources to a user, according to some implementations.

FIG. 12 is a flow diagram of an exemplary process 1200 for determining appropriate sources for a selected content item or service, and presenting the selected content item or service from the appropriate source to a user, according to some implementations. The user's computer system 1010 may enable a user to select a content item or service from a list of aggregated content items or services (1202). For example, this may be enabled by an appropriate GUI (e.g., GUI 600 in FIG. 6), wherein a user may select one of a list of content items (e.g., a list of movies 620 in FIG. 6). The source aggregation computer system 1030 may receive the user's request for a particular content item or service from the user's computer system 1010 (1204). The source aggregation computer system 1030 determines whether the user has specified a particular source for the selected content item or service (1206). If not, then the source aggregation computer system 1030 accesses the user's rights profile (1208) and identifies one or more sources and access privileges that are associated with the user, based on the user's rights profile (1210). Though, it should be appreciated that the sources identified to present to the user may include, in some implementations, sources for which the user does not have authorization to access. This may be useful, for example, to present the user with new discoverable sources that the user may be interested in establishing new relationships with. Regardless of the exact nature of the sources identified, source aggregation computer system 1030 may present a list of source options for the selected content item or service to the user (1212).

The user's computer system 1010 receives this list of source options, and enables the user to select a particular source for the content item or service (1214). The source aggregation computer system 1030 receives the user's selection for a particular source (1216), and may, in some implementations, access source rules associated with the selected source to determine a consumption mode specified by the source for displaying the selected content item or service to the user (1218). It should be appreciated, however, that the determination of a consumption mode for a source may be made at any suitable time and with any suitable frequency by the source aggregation computer system 1030. For example, in some implementations, the source aggregation computer system 1030 may access source rules for one or more sources that were identified as being associated with the user (e.g., in 1210), and then determine a consumption mode for each identified source for the selected content item or service, before presenting the list of source options to the user (e.g., in 1212). This may enable, for example, the source aggregation computer system 1030 to filter the list of source options presented to the user (e.g., in 1214) and only display those sources that have specified a consumption mode applicable or desirable to the user. The applicability or desirability of a consumption mode to a user may be based on, for example, the user's computing environment (type of device, operating system, firewalls, etc.) and/or the user's personal characteristics or specified preferences.

As a non-limiting example, in the context of a source as a cloud storage service provider, a user may want to access his or her particular document or file that may be stored as multiple copies across different cloud storage service providers. The source aggregation computer system 1030 may determine that the user is operating in a secured computing environment that has firewalls blocking access to a particular cloud storage service provider. In this scenario, the source aggregation computer system 1030 may choose to not display (i.e., censor) that particular cloud storage service provider from a list of available source options that is presented to the user for accessing his or her particular document or file, and instead only present as options those cloud storage service providers that are accessible to the user through the corporate firewall (e.g., in 1214). This may help mitigate problems of frustration and delay when the user attempts to access his or her particular document or file, and provide a more seamless experience in browsing and consuming the user's personal content and services, regardless of the exact nature of the source and/or regardless of the nature of the user's computing environment.

Based on the foregoing discussion, it should therefore be appreciated that the source aggregation computer system 1030 may access source rules for one or more sources to determine an appropriate consumption mode for a selected content item or service (e.g., 1218) at any appropriate time and with any particular frequency, and is not necessarily limited to doing so in the particular steps illustrated in FIG. 12.

The source aggregation computer system 1030 may request (1220) the selected content item or service from the appropriate source, which may have been selected by the user (e.g., in 1214) or which may have been pre-designated by either the user or by a particular source (e.g., in 1206 to 1218). The appropriate source from sources 1020 may receive the request for the selected content item or service, retrieve the content item or service (1222) and transmit information related to the selected content item or service to the source aggregation computer system 1030 (1224). The exact nature of the information related to the content item or service may depend on various factors, including but not limited to the consumption mode specified by the source. As an example, if the source is a cloud-based storage service, and has specified that the consumption mode for the user's requested storage service should be a framed website within the source aggregation site (e.g., GUI 920 of FIG. 9B), then the information about the service may simply be the cloud storage service provider's entire webpage. Alternatively, if the cloud storage service provider has agreed to allow the source aggregation computer system 1030 to present the user's cloud storage content within the native source aggregation site (e.g., GUI 900 of FIG. 9A), then the source may transmit the raw data for the user's stored documents and files (possibly encrypted to protect the user's privacy) to the source aggregation computer system 1030.

Regardless of the exact nature of the information that is transmitted from the selected source, the source aggregation computer system 1030 may receive the information related to the content item or service (1226) and transmit the information to the user's computer system 1010, according to the source's specified consumption mode (1228). The user's computer system 1010 may receive this information and display the selected content item or service to the user, according to the source's specified consumption mode (1230).

Figure 13:
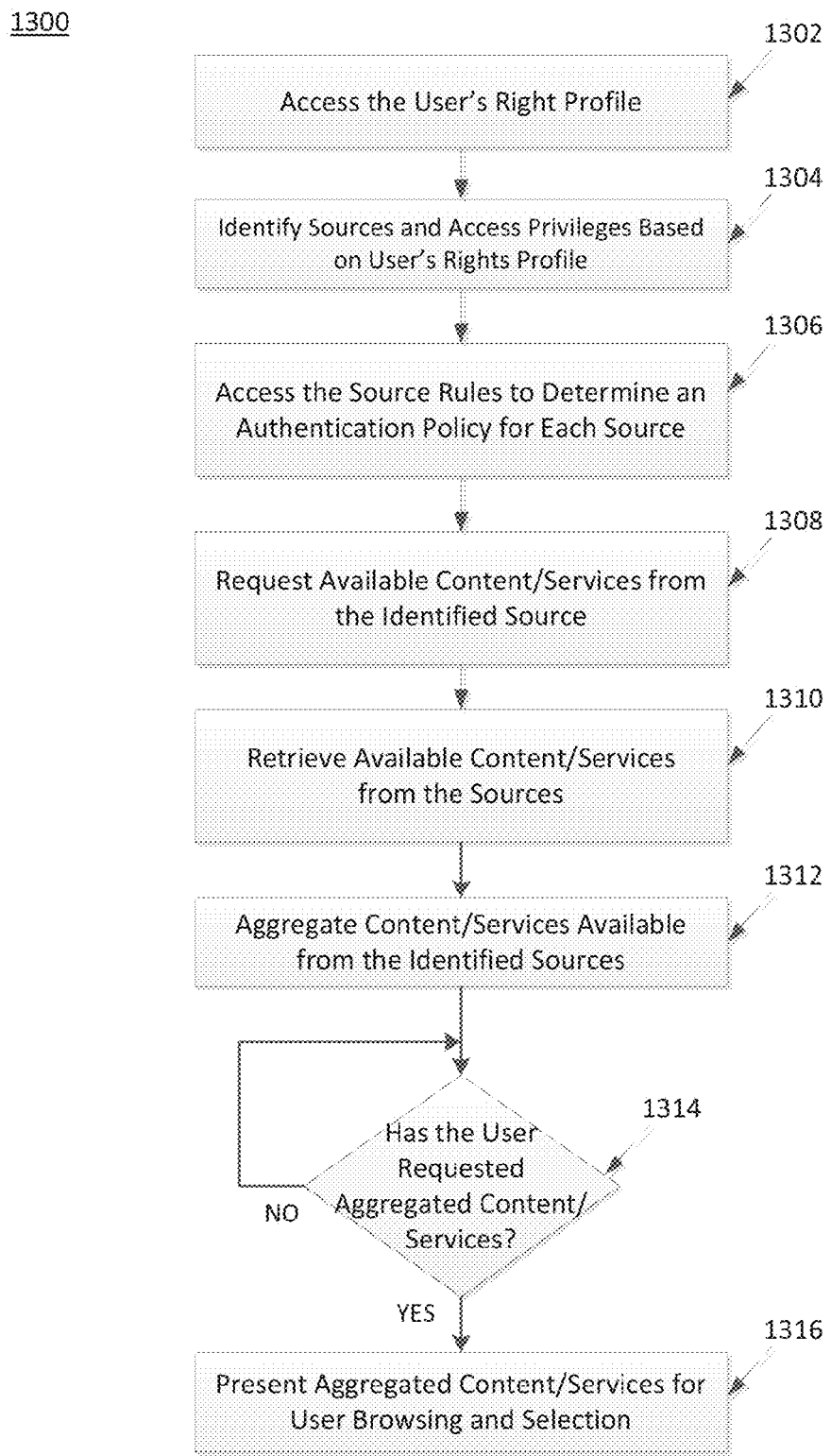
FIG. 13 is a flowchart of an exemplary process for aggregating personalized content and services from multiple sources and presenting the aggregated personalized content and services to a user, according to some implementations.

FIG. 13 is a flowchart of an exemplary process 1300 for aggregating content and services from multiple sources and presenting the aggregated content and services to a user, according to some implementations. A source authentication computer system (e.g., source authentication computer system 1030 of FIG. 10) may access a user's rights profile (1302) and identify applicable sources and access privileges associated with the user, based on the user's rights profile (1304). The source authentication computer system may then access source rules for the identified sources to determine an authentication policy for the source pertaining to the user (1306). At an appropriate subsequent time, the source aggregation computer system may request available content or services from the identified and authentication-approved sources (1308). The requested content or services may be received from the sources (1310), and the content or services may be aggregated to be made available to the user (1312). Additionally or alternatively, the source aggregation computer system may request content from sources that have not been identified in the user's rights profile and/or that are in the user's rights profile but that have not yet authenticated the user. As such, it should be appreciated that the aggregate content or services made available to a user may include sources that do not yet have relationships with the user. This may enable the source aggregation computer system to help the user discover new content and services from sources that the user may not have existing relationships with.

If the source aggregation computer system has received a request from the user for aggregated content and services (1314), then the source aggregation computer system may transmit the aggregated content and services to the user for browsing and selection (1316), and otherwise may wait to receive such a request. It should be appreciated, however, as mentioned in the foregoing in regards to FIG. 11, that the source authentication computer system may perform one or more of the steps in FIG. 13 (e.g., accessing the user's rights profile, authenticating the user with one or more sources, and retrieving content from the sources) on an on-demand basis, after a user has requested aggregated content and services (e.g., after 1314). As such, it should be appreciated that the accessing a user's rights profiles, authentication with sources, and retrieval of content or services may be performed any suitable time according to preferences of the user and/or sources, and are not necessarily limited to the particular order of steps shown in FIG. 13.

Figure 14:
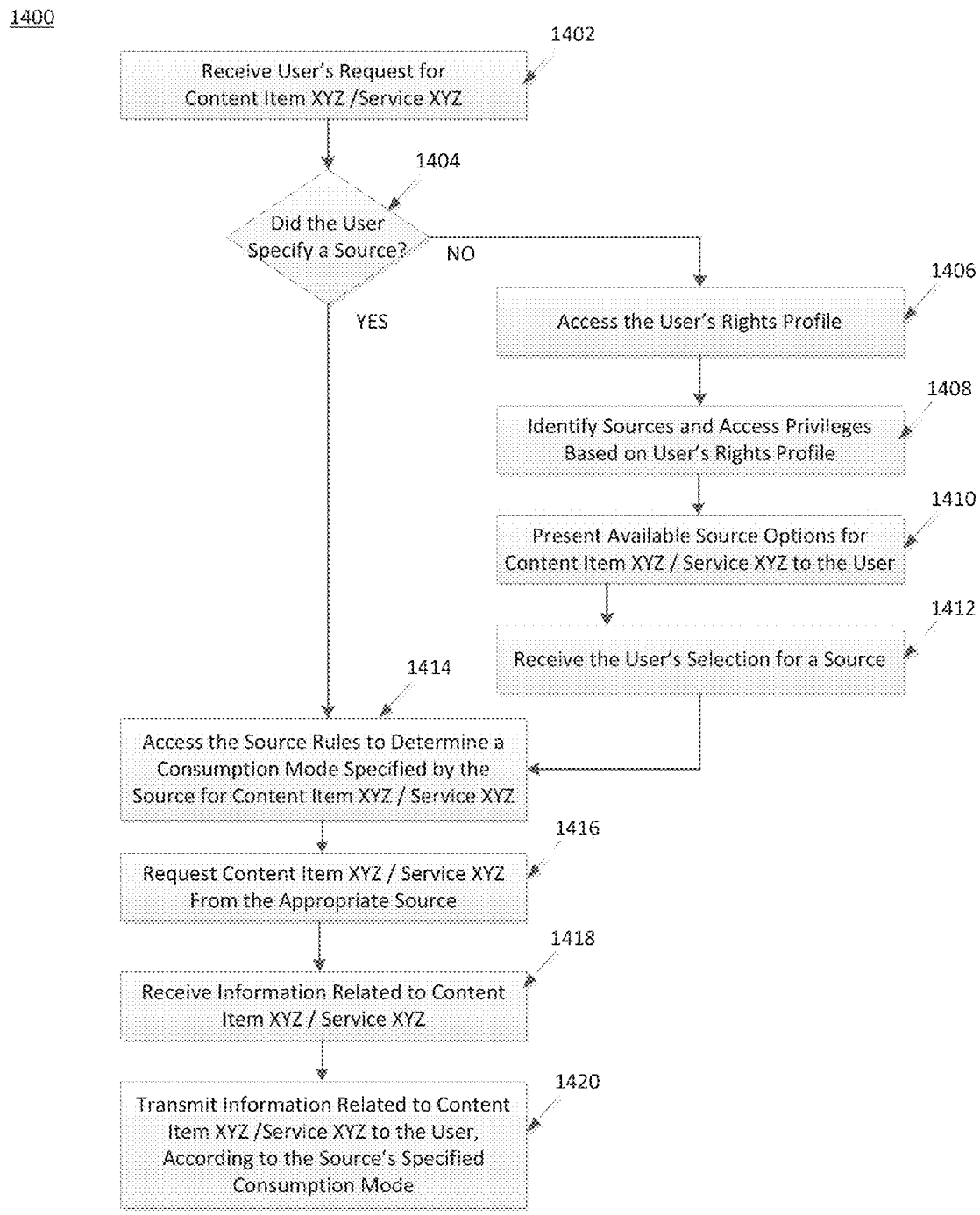
FIG. 14 is a flowchart of an exemplary process for determining an appropriate source for content and services, and presenting content and services from the appropriate source to a user, according to some implementations.

FIG. 14 is a flowchart of an exemplary process 1400 for determining an appropriate source for a selected content item or service, and presenting the content item or service from the appropriate source to a user, according to some implementations. A source authentication computer system (e.g., source authentication computer system 1030 of FIG. 10) may receive a user's request for a particular content item or service (1402). The source authentication computer system may determine whether the user has specified a particular source for the selected content item or service (1404), and if not, may access the user's rights profile (1406), and identify one or more sources and access privileges associated with the user, based on the rights profile (1408). The identified sources may be presented to the user as a list of available source options for the particular selected content item or service (1410). It should be appreciated, however, that the list of available source options presented to the user is not necessarily limited to sources with which the user has relationships, and may in some implementations include sources that do not have an existing relationship with the user. The latter may be useful, for example, to help the user discover new sources of content and services that may be of interest to the user, for example, based on the user's preferences, past history, existing source relationships, etc.

Regardless of the exact nature of the list of source options that is presented to the user for the selected content item or service, after presenting the user with the source options, the source aggregation computer system may receive the user's selection for a particular source (1412). Based on the user's selected source, the source aggregation computer system may access one or more source rules associated with the selected source to determine, possibly among other things, a consumption mode specified by the source for the selected content item or service (1414). Based on the specified consumption mode, if any, the source aggregation computer system may request the selected content item or service from the appropriate source (1416). Upon receiving the information related to the requested content item or service from the source (1418), the source aggregation computer system may transmit the information related to the content item or service to the user, according to the source's specified consumption mode (1420).

It should be appreciated, however, as mentioned in the foregoing in regards to FIG. 12, that the accessing of a user rights profiles and/or source rules is not necessarily limited to any particular timing or frequency, and may be performed at various steps. For example, the source aggregation computer system may access the source rules prior to presenting available source options to a user (e.g., in 1410), to filter the presented source options based on consumption modes that may not be compatible with the user's computing environment or personal preferences. For example, if the user has indicated a dislike for a particular consumption mode, such as a pop-up window, then the source aggregation computer system may choose to not display (i.e., censor), from the list of available source options, those sources which have specified a consumption mode Involving a pop-up window for the selected content item or service. As such, the source aggregation computer system may provide a user with an integrated environment through which to browse various types of content and services from different sources, each of which may have its own formatting and display technologies, in a seamless and unified manner that facilitates not only interaction with existing personal content, but also discovery of new content.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims.

What is claimed is:

1. A computer-implemented method, the method comprising:
    receiving, by a source aggregation computer system and from a user computer system, identifying information for a user;
    transmitting, by the source aggregation computer system and to a first computer system associated with a first entity that manages and provides access to media content and services for a first source, the identifying information for the user;
    receiving, by the source aggregation computer system and from the first computer system, first login credentials associated with the user for the first entity based on the transmitted identifying information;
    transmitting, by the source aggregation computer system and to a second computer system associated with a second entity that manages and provides access to media content and services for a second source, the identifying information for the user;
    receiving, by the source aggregation computer system and from the second computer system, second login credentials associated with the user for the second entity based on the transmitted identifying information;
    storing, by the source aggregation computer system in a rights profile of the user, the received first login credentials and the received second login credentials;
    accessing the stored rights profile of the user,
    based on the stored rights profile of the user, determining associated access privileges of the user to content items or services provided by the first source and to content items or services provided by the second source, the access privileges comprising:
        the first login credentials associated with the user for the first entity that manages and provides access to media content and services for the first source; and
        the second login credentials associated with the user for the second entity that manages and provides access to media content and services for the second source;
    determining, based on the access privileges of the user, multiple access options to a particular content item or to a particular service available to the user, the multiple access options including a first access option corresponding to accessing the particular content item or the particular service from the first source and a second access option corresponding to accessing the particular content item or the particular service from the second source;
    presenting, to the user, the determined multiple access options to the particular content item or the particular service;
    receiving a selection, from the user, of the first access option;
    accessing stored business rules for the first source, the stored business rules identifying a content consumption mode specified by the first source for enabling users to consume content items or services provided by the first source; and
    enabling the user to perceive the particular content item or receive the particular service in accordance with the content consumption mode specified by the first source.

2. The method of claim 1, further comprising:
    determining, based on the access privileges of the user, multiple access options to a second particular content item or to a second particular service available to the user, the multiple access options to the second particular content item or to the second particular service including a first access option corresponding to accessing the second particular content item or the second particular service from the first source and a second access option corresponding to accessing the second particular content item or the second particular service from the second source;
    presenting, to the user, the determined multiple access options to the second particular content item or the second particular service;
    receiving a selection, from the user, of the second access option to the second particular content item or the second particular service;
    accessing stored business rules for the second source, the stored business rules identifying a content consumption mode specified by the second source for enabling users to consume content items or services provided by the second source; and enabling the user to perceive the second particular content item or receive the second particular service in accordance with the content consumption mode specified by the second source.

3. The method of claim 2, wherein the content consumption mode specified by the second source and the content consumption mode specified by the first source are different modes.

4. The method of claim 1, wherein the content consumption mode specified by the first source includes at least one of a native media player associated with a website, a framed third-party media player displayed by a website, or a media player application associated with a mobile device on which the method operates.

5. The method of claim 1, wherein the multiple access options to the particular content item or to the particular service include a first access option to the particular content item or to the particular service provided by the first source and a second access option to the particular content item or to the particular service provided by the second source.

6. The method of claim 1, wherein the content items provided by the first source and the content items provided by the second source comprise at least one of a movie, a song, an image, a text document, an e-book, an e-magazine, a television show episode, an application, or a video clip.

7. The method of claim 1, wherein the services provided by the first source and the services provided by the second source comprise at least one of an electronic communications service, a content sharing service, or a cloud storage service.

8. The method of claim 1, further comprising determining the particular content item or the particular service based on a request received from the user for the particular content item or the particular service.

9. The method of claim 8, wherein the request from the user for the particular content item or the particular service is received based on transmitting, to the user, an aggregated set of content items or services that includes content items and services available from the first source and content items and services available from the second source, wherein the particular content item or the particular service requested by the user is selected from among the aggregate content items or services.

10. The method of claim 9, further comprising receiving, from at least one computer associated with the first source and from at least one computer associated with the second source, the aggregated set of content items or services that are available from the first source and the second source.

11. The method of claim 10, wherein receiving, from the at least one computer associated with the first source and from the at least one computer associated with the second source, the aggregated set of content items or services that are available from the first source and the second source is conditioned upon satisfying a first authentication policy associated with the first source and a second authentication policy associated with the second source.

12. The method of claim 11, wherein satisfying an authentication policy associated with the first source comprises:
  accessing user credentials from the stored rights profile of the user; and
  authenticating a connection with the first source based on the user credentials.

13. The method of claim 1, wherein accessing the stored rights profile of the user comprises:
  determining a single login provided by the user;
  automatically requesting, based on the single login provided by the user and from a first computer associated with the first entity corresponding to the first source, information related to a first access privilege of the user to content items and services provided by the first source; and
  automatically requesting, based on the single login provided by the user and from a second computer associated with the second entity corresponding to the second source, information related to a second access privilege of the user to content items and services provided by the second source.

14. The method of claim 1,
wherein transmitting the identifying information for the user, by the source aggregation computer system, to the first computer system and to the second computer system comprises:
  transmitting at least one of a real name of the user or a geographic address of the user, and
wherein receiving, by the source aggregation computer system and from the first computer system and from the second computer system, the first login credentials and the second login credentials associated with the user, respectively, comprises:
  receiving a first login name for the first computer system and a second login name for the second computer system.

15. A source aggregation computer system comprising:
one or more computers and one or more storage devices storing instructions that are operable, when executed by the one or more computers, to cause the one or more computers to perform operations comprising:
receiving, by the one or more computers of the source aggregation computer system and from a user computer system, identifying information for a user;
transmitting, by the one or more computers of the source aggregation computer system and to a first computer system associated with a first entity that manages and provides access to media content and services for a first source, the identifying information for the user;
receiving, by the one or more computers of the source aggregation computer system and from the first computer system, first login credentials associated with the user for the first entity based on the transmitted identifying information;
transmitting, by the one or more computers of the source aggregation computer system and to a second computer system associated with a second entity that manages and provides access to media content and services for a second source, the identifying information for the user;
receiving, by the one or more computers of the source aggregation computer system and from the second computer system, second login credentials associated with the user for the second entity based on the transmitted identifying information;
storing, by the one or more computers of the source aggregation computer system in a rights profile of the user, the received first login credentials and the received second login credentials;
accessing the stored rights profile of the user,
based on the stored rights profile of the user, determining associated access privileges of the user to content items or services provided by the first source and to content items or services provided by the second source, the access privileges comprising:
  the first login credentials associated with the user for the first entity that manages and provides access to media content and services for the first source; and the second login credentials associated with the user for the second entity that manages and provides access to media content and services for the second source;

determining, based on the access privileges of the user, multiple access options to a particular content item or to a particular service available to the user, the multiple access options including a first access option corresponding to accessing the particular content item or the particular service from the first source and a second access option corresponding to accessing the particular content item or the particular service from the second source;

presenting, to the user, the determined multiple access options to the particular content item or the particular service;

receiving a selection, from the user, of the first access option;

accessing stored business rules for the first source, the stored business rules identifying a content consumption mode specified by the first source for enabling users to consume content items or services provided by the first source; and enabling the user to perceive the particular content item or receive the particular service in accordance with the content consumption mode specified by the first source.

16. The system of claim 15, wherein the operations further comprise:
   determining, based on the access privileges of the user, multiple access options to a second particular content item or to a second particular service available to the user, the multiple access options to the second particular content item or to the second particular service including a first access option corresponding to accessing the second particular content item or the second particular service from the first source and a second access option corresponding to accessing the second particular content item or the second particular service from the second source;
   presenting, to the user, the determined multiple access options to the second particular content item or the second particular service;
   receiving a selection, from the user, of the second access option to the second particular content item or the second particular service;
   accessing stored business rules for the second source, the stored business rules identifying a content consumption mode specified by the second source for enabling users to consume content items or services provided by the second source; and
   enabling the user to perceive the second particular content item or receive the second particular service in accordance with the content consumption mode specified by the second source.

17. The system of claim 16, wherein the content consumption mode specified by the second source and the content consumption mode specified by the first source are different modes.

18. The system of claim 15, wherein the content consumption mode specified by the first source includes at least one of a native media player associated with a website, a framed third-party media player displayed by a website, or a media player application associated with a mobile device on which the method operates.

19. The system of claim 15, wherein the operations further comprise determining the particular content item or particular service based on a request received from the user for the particular content item or the particular service.

20. The system of claim 19, wherein the request from the user for the particular content item or the particular service is received based on transmitting, to the user, an aggregated set of content items or services that includes content items and services available from the first source and content items and services available from the second source, wherein the particular content item or the particular service requested by the user is selected from among the aggregate content items or services.

21. The system of claim 15,
   wherein transmitting the identifying information for the user, by the source aggregation computer system, to the first computer system and to the second computer system comprises:
      transmitting at least one of a real name of the user or a geographic address of the user, and
   wherein receiving, by the source aggregation computer system and from the first computer system and from the second computer system, the first login credentials and the second login credentials associated with the user, respectively, comprises:
      receiving a first login name for the first computer system and a second login name for the second computer system.

22. At least one computer-readable storage medium encoded with at least one computer program comprising instructions that, when executed, operate to cause at least one processor to perform operations comprising:
   receiving, by a source aggregation computer system and from a user computer system, identifying information for a user;
   transmitting, by the source aggregation computer system and to a first computer system associated with a first entity that manages and provides access to media content and services for a first source, the identifying information for the user;
   receiving, by the source aggregation computer system and from the first computer system, first login credentials associated with the user for the first entity based on the transmitted identifying information;
   transmitting, by the source aggregation computer system and to a second computer system associated with a second entity that manages and provides access to media content and services for a second source, the identifying information for the user;
   receiving, by the source aggregation computer system and from the second computer system, second login credentials associated with the user for the second entity based on the transmitted identifying information;
   storing, by the source aggregation computer system in a rights profile of the user, the received first login credentials and the received second login credentials;
   accessing the stored rights profile of the user,
   based on the stored rights profile of the user, determining associated access privileges of the user to content items or services provided by the first source and to content items or services provided by the second source, the access privileges comprising:
      the first login credentials associated with the user for the first entity that manages and provides access to media content and services for the first source; and
      the second login credentials associated with the user for the second entity that manages and provides access to media content and services for the second source;
   determining, based on the access privileges of the user, multiple access options to a particular content item or to a particular service available to the user, the multiple access options including a first access option corresponding to accessing the particular content item or the particular service from the first source and a second access option corresponding to accessing the particular content item or the particular service from the second source;

presenting, to the user, the determined multiple access options to the particular content item or the particular service;

receiving a selection, from the user, of the first access option;

accessing stored business rules for the first source, the stored business rules identifying a content consumption mode specified by the first source for enabling users to consume content items or services provided by the first source; and enabling the user to perceive the particular content item or receive the particular service in accordance with the content consumption mode specified by the first source.

* * * * *